(12) United States Patent
Staniulis, Jr.

(10) Patent No.: US 11,389,996 B1
(45) Date of Patent: *Jul. 19, 2022

(54) METHOD OF MAKING A MONOLITHIC AND INTEGRAL AIR TRANSFER APPARATUS

(71) Applicant: Anthony Staniulis, Jr., Las Vegas, NV (US)

(72) Inventor: Anthony Staniulis, Jr., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,486

(22) Filed: Jan. 19, 2022

Related U.S. Application Data

(63) Continuation-in-part of application No. 17/322,910, filed on May 18, 2021, now Pat. No. 11,260,565.

(51) Int. Cl.
| | |
|---|---|
| *B29C 45/00* | (2006.01) |
| *B29C 45/17* | (2006.01) |
| *B29L 31/00* | (2006.01) |
| *B29K 23/00* | (2006.01) |
| *F28F 13/00* | (2006.01) |

(52) U.S. Cl.
CPC .. *B29C 45/1704* (2013.01); *B29C 2045/0079* (2013.01); *B29K 2023/065* (2013.01); *B29L 2031/779* (2013.01); *F28F 13/003* (2013.01); *F28F 2255/143* (2013.01)

(58) Field of Classification Search
CPC ........ B29C 45/1704; B29C 2045/0079; B29C 45/0001; B29K 2023/065; B29L 2031/779; B29L 2031/18; F28C 1/14; F28C 2001/006; F28F 13/003; F28F 2255/143

USPC ....................................................... 264/478
See application file for complete search history.

(56) References Cited

U.S. PATENT DOCUMENTS

| | | | | |
|---|---|---|---|---|
| 3,739,556 | A * | 6/1973 | Waters | F28F 25/087 96/356 |
| 6,392,208 | B1 * | 5/2002 | Arx | B29C 66/1122 219/544 |
| 6,855,440 | B2 * | 2/2005 | Bracegirdle | B29C 48/12 428/428 |
| 6,863,941 | B2 * | 3/2005 | Detounay | B60K 15/03177 264/250 |
| 6,931,883 | B2 * | 8/2005 | Bourne | F24F 1/0059 62/314 |
| 8,468,846 | B2 * | 6/2013 | Vaidyanathan | F24F 5/0035 62/304 |

(Continued)

FOREIGN PATENT DOCUMENTS

EP 0162117 A1 * 11/1985

*Primary Examiner* — Charles S Bushey
(74) *Attorney, Agent, or Firm* — Bayramoglu Law Offices LLC

(57) ABSTRACT

An air transfer apparatus being made as a monolithic or an integral structure or enclosure. The air transfer apparatus is made from a non-porous material and is made from any of the manufacturing methods of molding, injection molding, gas assisted injection molding, liquid/water assisted injection molding, blow molding, extruding, electrofusion or 3-D printing. The air transfer apparatus can be any of a cooling tower, a swamp cooler or a cooling Indirect Direct Evaporative Cooler. The air transfer apparatus has at least one integral cavity manufactured therein and at least one heat exchanger pad can be attached to the air transfer apparatus or made integral with the air transfer apparatus.

19 Claims, 17 Drawing Sheets

(56) References Cited

U.S. PATENT DOCUMENTS

| | | | |
|---|---|---|---|
| 10,124,533 B2 * | 11/2018 | Uliel | B29C 66/52241 |
| 10,583,535 B2 * | 3/2020 | Caimano | F28F 9/0209 |
| 10,900,679 B1 * | 1/2021 | Staniulis, Jr. | F28F 27/003 |
| 10,900,724 B1 * | 1/2021 | Staniulis, Jr. | F28F 25/12 |
| 11,073,335 B1 * | 7/2021 | Staniulis, Jr. | F28C 1/14 |
| 11,260,565 B1 * | 3/2022 | Staniulis, Jr. | F28C 1/14 |
| 2005/0001334 A1 * | 1/2005 | Roberts | F24F 5/0035 261/36.1 |
| 2010/0276133 A1 * | 11/2010 | Ojiro | F28D 1/0477 165/181 |
| 2011/0040007 A1 * | 2/2011 | Chandrasekhar | H01B 1/22 524/404 |
| 2011/0089797 A1 * | 4/2011 | Simms | A47B 47/042 312/352 |
| 2015/0037525 A1 * | 2/2015 | Maeda | B29C 66/7465 264/478 |
| 2017/0241655 A1 * | 8/2017 | LePoudre | F24F 3/147 |
| 2018/0299167 A1 * | 10/2018 | Miles | B29C 44/14 |
| 2021/0300218 A1 * | 9/2021 | Greenwood | B60N 2/5642 |

* cited by examiner

METHOD OF MAKING A MONOLITHIC AND INTEGRAL AIR TRANSFER APPARATUS

CROSS-REFERENCE TO RELATED APPLICATIONS

This application is a continuation in part of U.S. patent application Ser. No. 17/322,910, filed on May 18, 2021, now U.S. Pat. No. 11,260,565 B1 issued on Mar. 1, 2022, the entire contents of which are incorporated herein by reference.

TECHNICAL FIELD

The present disclosure relates to a method of making a monolithic air transfer apparatus or enclosure and/or an integral air transfer apparatus or enclosure to which a heat exchanger, such as an evaporative heat exchanger, can be integrally made, attached and/or adapted thereto. The air transfer apparatus or enclosure can and may be any one of a cooling tower, a swamp cooler or a cooling Indirect Direct Evaporative Cooler (IDEC). The air transfer apparatus or enclosure is manufactured from a non-porous material and/or comprises a non-porous material and is manufactured from any of the manufacturing methods of molding, injection molding, gas assisted injection molding, liquid/water assisted injection molding, blow molding, extruding, electrofusion, 3-D printing or any other equivalent method.

BACKGROUND

Evaporative coolers provide cool air by converting hot dry air through an evaporative process. This evaporative process works by forcing warm air through fluidly moist heat exchange pads to remove the hot dry air's heat. A supply air stream which is cooled enters into a desired space. A more specific type of evaporative cooling process is a two-stage indirect-direct evaporative cooling system, which offers good cooling effectiveness and expands the regions of the world where evaporative cooling can be used.

Direct evaporative cooling cools air by evaporating water which increases the moisture content of the air. One goal of a direct evaporative cooling system is to have the supply air temperature leaving the evaporative cooler approach the outdoor wet-bulb temperature. Direct evaporative cooling systems are suitable for hot and dry climates where the design wet-bulb temperature is 68° F. or lower. In other climates, outdoor humidity levels are too high to allow for sufficient cooling.

Indirect evaporative cooling uses a heat exchanger to remove heat from a supply air stream without adding moisture.

When indirect cooling is combined with direct evaporative cooling, the supply air is cooled and additionally some moisture is added to the supply air. This combination of indirect cooling and direct evaporative cooling is known as a two-stage system which is referred to in the art and in the industry as indirect-direct or indirect-direct evaporative cooler/cooling (IDEC) systems and can meet the cooling load for industrial, residential and commercial buildings in arid to semi-arid climates. IDEC systems provide cooler supply air at a lower relative humidity than direct evaporative cooling units. First, the indirect stage cools the supply air without increasing humidity. Since the air is cooled, the air has a reduced capacity to hold moisture. Next, the supply air is then passed through a direct cooling stage, which cools the air further while adding additional moisture. IDEC systems typically cool air to a temperature slightly below the outdoor air wet-bulb temperature.

IDEC systems used in arid climates (with a design wet bulb temperature of 66° F. or lower) have a power consumption typically lower than a compressor-based cooling system. However, in more humid climates indirect-direct systems have less power reduction and energy savings than other cooling solutions.

Since the internal surfaces of conventional cooling towers are made from metal, in the above evaporative cooling systems, these metal inside surfaces of the conventional cooling towers rapidly form mold, mildew, calcination and deposits of metals due to the cooling towers metal inner surface being contacted with water. These deposits of mold, mildew, calcination and metals reduce the cooling efficiency of the cooling system and reduces the useful life of the cooling system overtime since the formations of mold, mildew, calcination and metals onto the inner surface of the cooling tower and on the surfaces of the heat exchanger(s) reduce the effective cooling passage flow areas within the heat exchangers and form a thermal barrier layer within the cooling passages of the heat exchangers and therefore reduces the cooling efficiency of the heat exchangers and further increases the operational cost of the cooling system by having to input more electrical energy such as more power to the pumps and fans in order to run the pumps and fans at higher speeds to compensate for the reduced cooling efficiency caused by the buildup of mold, mildew, calcination and deposits of metals onto the inner surface of the cooling tower and heat exchanger(s). Also, these deposits of mold, mildew, calcination and metals on the metals surfaces of a cooling tower cause the metal surfaces of the cooling tower to rust and eventually holes form on the metal surfaces of a cooling tower and the cooling tower fails to perform its cooling and/or heating (i.e. heat transfer) function. Furthermore, very frequent maintenance and cleaning of the conventional cooling towers are required which adds very high costs to the operator of the cooling system.

Additionally, conventional metal cooling towers are made from a multitude of separate and individual pieces and/or plates which all have to be connected together with a multitude of separate fasteners such as screws or other fasteners or even solder or welding material. It is well known in the art that it is almost practically impossible to join metal pieces or plates together without having micropores which create fluid leaks due to imperfect and defective sealing and from the different parts causing thermal stresses upon each other which thermally expand at different rates which creates gaps between the fastened pieces/material and therefore causes fluid leakage as well as create cracks in the materials of the cooling tower. Also, fastening or joining a multitude of separate and individual pieces and/or plates together adds costs to the conventionally manufactured cooling tower by adding addition manufacturing steps of having to assemble all parts and/or pieces together and having to add material such as seals, soldering material and welding material in order to try to prevent fluid leakage between the joined or fastened parts. Moreover, the maintenance costs of the assembled conventional cooling towers are large because over time seals will leak and fail and therefore will need to be replaced, fasteners will fail and need replacing due to thermal cycling which induces thermal stress and the parts soldered or welded together will need to be re-soldered and re-welded because the soldered and welded joints do fail and leak over time due to thermal stress and corrosion due to being exposed to a plurality of varying conditions within an environment.

Therefore, there is an important need to provide an energy saving, efficient and low cost and maintenance method of manufacturing a cooling tower and evaporative cooling system.

The present disclosure and invention has solved the above problems of mold, mildew, calcination and deposits of metals forming on the inner surface of a cooling tower and heat exchanger or other apparatus by having all inside surfaces of a monolithic air transfer apparatus and/or an integral air transfer apparatus made from and/or comprise a non-porous material such as high-density polyethylene (HDPE) and not made from metal.

Also, the present disclosure and invention has solved the above problems of conventional cooling towers by manufacturing a monolithic air transfer apparatus and/or an integral air transfer apparatus which prevents fluid leaks, stresses, thermal stresses and prevents gaps forming in the air transfer apparatus or enclosure because the air transfer apparatus or enclosure is made monolithically and/or integrally and thus avoids having to fasten together multiple different material parts and parts with different thicknesses and therefore the monolithic and/or integral air transfer apparatus or enclosure avoids any leaking joints.

The present disclosure includes all inside surfaces of a monolithic air transfer apparatus and/or an integral air transfer apparatus, which may be a cooling tower, manufactured from and/or comprise a non-porous material such as high-density polyethylene (HDPE) which prevents the formation of mold, mildew, calcination and deposits of metals on the inner surfaces of the monolithic air transfer apparatus and/or the integral air transfer apparatus and therefore increases the cooling efficiency and the operational life of the monolithic air transfer apparatus and/or the integral air transfer apparatus and the evaporative cooling system as well as lowers the cost of operating the monolithic air transfer apparatus and/or the integral air transfer apparatus and evaporative cooling system by reducing the consumption of power to run the pumps, fans and other system components and by eliminating frequent cleaning and maintenance. The monolithic air transfer apparatus and/or the integral air transfer apparatus comprises at least one heat exchanger, such as an indirect heat exchanger pad and/or evaporative heat exchanger or is adapted to have at least one heat exchanger, such as an indirect heat exchanger pad and/or evaporative heat exchanger, attached therein and/or thereto. The at least one heat exchanger is made from and/or comprise a non-porous material such as high-density polyethylene (HDPE). Therefore, all inside surfaces of the monolithic air transfer apparatus and/or the integral air transfer apparatus are made from and/or comprise a non-porous material such as high-density polyethylene (HDPE) and not made from metal. Moreover, a heat exchanger can be installed on any one side or more than one side (the sides include a left side, a right side, a front side, a back side and the top of the air transfer apparatus) of the monolithic air transfer apparatus or the integral air transfer apparatus. However, in view of a desired application or of a desired heat load, the heat exchanger, such as an indirect heat exchanger pad, may be made from a material, other than HDPE, such as an alloy, a thermally conductive composite material or a metal.

Additionally, the present disclosure and invention includes a monolithic or integral air transfer apparatus or enclosure that is a monolithic or integral structure or enclosure with an integral cavity and/or other cavities (i.e. the air transfer apparatus or enclosure and the cavity and other cavities are formed and/or manufactured from a single piece of material, i.e. one piece, such that the integral cavity and/or cavities are formed out of the monolithic air transfer apparatus or enclosure instead of the monolithic air transfer apparatus or enclosure being formed from a plurality of parts). The monolithic air transfer apparatus or enclosure being an integral or a monolithic structure or enclosure solves the problem of preventing water and air leaks and prevents the monolithic structure or enclosure from obtaining cracks due to different material expansion rates and from "pulling apart" due to no joints such as solder, welding or other connected and assembled joints. This also reduces costs of shipping, manufacturing and installation of the air transfer apparatus and reduces the time to manufacture and install the monolithic air transfer apparatus or enclosure because a plurality of apparatus including valves, pumps and motors are installed within the integral cavity and/or cavities of the air transfer apparatus or enclosure after the manufacturing (i.e. after the air transfer apparatus or enclosure is made) of the air transfer apparatus or enclosure but before (i.e. pre-installed) within the integral cavity and/or cavities prior to the site/location installation of the air transfer apparatus or enclosure. Also, the integral cavity and/or cavities reduces the noise heard from the pumps and motors because the integral cavity and/or cavities dampen(s) the sound heard outside of the integral cavity and/or cavities and therefore the air transfer apparatus or enclosure with the integral cavity and/or cavities solves the problem of being able to install the air transfer apparatus or enclosure in an environment which requires little or no noise.

SUMMARY

The present disclosure is a method of manufacturing an air transfer apparatus or enclosure. The air transfer apparatus or enclosure is manufactured from a non-porous material and/or comprising a non-porous material and from any of the manufacturing methods of molding, injection molding, gas assisted injection molding, liquid/water assisted injection molding, blow molding, extruding, electrofusion, 3-D printing or any other equivalent method.

Injection Molding:

Injection molding is the process of heating material such as raw material granules (resin) to the point of melting, where the material is pressed into a mould and cooled into its final shape. In injection molding, raw material granules (resin) are placed in a hopper and plunged through a heated channel to be melted to liquid prior to reaching a mould and subsequently cooled to become a solid final piece.

For example, to create an injection-molded product, the following steps are performed:

A mould is placed in an injection molding machine.

Pellets are heated until they are liquid.

The liquid plastic may pass through a dryer if necessary, in order to remove moisture from heating the pellets, where the moisture may harm the finished product due to splay or hydrolysis.

The liquid formed from the liquified pellets is conveyed into the injection molding machine through a vacuum, an auger or other equivalent apparatus or method.

The liquid formed from the liquified pellets goes through a heated injection barrel, which is attached to a feeder/feed throat.

The liquid formed from the liquified pellets is injected under pressure through the feed throat into the mould.

The mould, which is cooler than the liquid formed from the liquified pellets since the mould is cooled via a cooling system and/or apparatus, causes the material of the liquid to cool to a solid state, which forms the part. However, the mould can be heated to the same temperature as the liquid formed from the liquified pellets when the liquid formed from the liquified pellets first enters the mould and one the mould is filled with the liquid, then the mould is cooled via a cooling system and/or apparatus to cause the material of the liquid to cool to a solid state.

The mould opens and the cooled part is ejected from the mould either by hand (in a vertical injection molding machine) or by force of gravity (in a horizontal injection molding machine).

Gas can be used in combination with injection molding and is called gas assisted injection molding. Similarly, a liquid can be used in combination with injection molding and is called liquid assisted injection molding. If the liquid is water, then the injection molding is called water assisted injection molding.

Gas Assisted Injection Molding:

Gas assisted injection molding is shooting gas (i.e. for example at a pressure range of 300 psi to 2500 psi, but the pressure could be lower than 300 psi or higher than 2500 psi) into the material-filled injection mould which makes hollow sections in the part being made.

Internal gas assist injection molding is a low pressure, injection molding process that injects pressurized gas, such as nitrogen, into an interior of a short shot of melted material. Short shots are molded parts that are not completely filled out. The gas flows through strategically designed and placed gas channels, following the path of least resistance to displace the material in the thick areas of the part by forming hollow sections. The pressurized gas packs and holds the molten material against cavity walls until the part solidifies. The gas pressure is kept constant in order to keep the part from shrinking when the part begins to cool and prior to being ejected from the mould. Once the part solidifies, the gas is vented out a port of the mould.

In an external gas assisted injection molding application, the gas is used on the outside surface, but still within the mould cavity, to consolidate the component.

Gas assisted injection molding injects pressurized nitrogen or other used gas into the interior of the polymer melt. The gas follows the path of least resistance, penetrating the part via carefully designed networks of thicker cross-sectioned gas channels. Nitrogen or the other used gas seeks the area in the mould cavity with the lowest pressure and travels most efficiently in the hotter core regions of the polymer melt. It has a viscosity much lower than its polymer or HDPE host and remains isolated within the channel as it flows in the direction of the melt front. The displaced molten polymer is pushed towards the melt front by the advancing gas, filling and later packing the mould cavity.

There is almost constant pressure in all areas penetrated by the gas. The pressure pushes the polymer against the mould walls and helps keep the polymer from shrinking as the part begins to cool before ejection from the mould.

Most gas-assist injection moldings fall into two categories. The first method injects the polymer and gas through the same injection nozzle. The polymer only partially fills the cavity in what's called a short-shot. Then gas injection pushes material from the core regions to fill out the cavity.

The second employs full-shot molding and fills the cavity completely with polymer. Gas then enters via gas pins at various locations in the mould. This packs the melt into difficult-to-fill areas and helps compensate for shrinkage as the polymer cools. Gas can be injected sequentially and at various pressures which are typically rather low.

Gas injection through the nozzle is generally the simplest of the two methods to implement. There's no need for extra hardware such as gas injectors, nozzles, or pins when injecting nitrogen directly into the cavity. But gas-injection pressures must be high enough to make the gas break through the residual polymer left inside the nozzle.

An alternative method is multi-nozzle gas-assist. This multi-nozzle gas-assist allows to strategically position injection sites of both the polymer and gas to obtain and get optimum mould fill. Independent control of injection points and gas pressure is helpful for tailoring the injection of large, complex parts.

Parts with multiple or branched gas channels require special measures to balance mould fill. One suggestion is to use the existing rib configuration and place the channels at the base of the ribs for guiding the gas to the mould extremities. Mould-fill analysis programs designed specifically for the gas-assist process can help determine gate, channel, and gas injection locations for balancing mould fill.

It's imperative to exactly balance melt flow into the cavities of multicavity tools. Mould-fill analysis software can help.

Cavities can be arranged symmetrically and/or asymmetrically in the mould and each should have its own separate gas needle.

Water Assisted Injection Molding:

Water assisted injection molding is similar to gas assisted molding as a means to core out thick sections but can provide for a more uniform inner wall.

Water assisted injection molding is an injection molding process where a molten material along with water is injected into a mould to create a part such as a sold and solid and hollow part/component.

On example of water assisted injection molding is disclosed below.

Pellets are supplied via a hopper into a rotating screw or helical screw or auger whose spiral shape moves the pellet forward through a heated chamber. The pellets are heated gradually and turn into a homogeneous melt as the melt approaches an end of the screw. The melt is pressed in a mould as the entire screw is pushed forward by an applied pressing force and after the mould is partially filled, water is injected which pushes the melt and fills the mould while a hollow is created in the part. The water is flushed through the part and discharged through an outlet on the other end of the piece. After the melt is solidified via cooling, the part is removed from the mould using an ejector.

Nozzles can inject water or gas and can also act as an outlet for water ejection from the part. The nozzles can be mounted flush with the mould to introduce water by breaking through the part surface, or they can protrude into the mould cavity and core directly from within the part. The water assisted injection molding operates in a range up to 4350 psi.

Water assisted injection molding can be applied in one of four processes.

Short shot: Also called the bubble or blow-up process, it is executed by partial filling of the mould cavity with melt. Water is injected into the mould before the end of the melt injection, pushing the material to the end of the cavity for final packing. Valves close off the melt from the injection unit and water from the pin. A release valve for the water opens allowing water to drain from the part. A valve mounted at or near the end of fill can facilitate water evacuation using compressed air. The entry and exit points for water or air can be at or near the same point. The water injection pressure is higher than the melt pressure to push the melt to end of fill.

Pushback: The melt completely fills the cavity. Opening a water pin located near the end of the melt fill pushes the excess melt back into the head space in the injection unit. A nozzle and check ring accommodate material coming back into the injection unit.

Overflow: The mould cavity is completely filled with the melt and closed off by a valve. A separate pin then opens in the mould for water injection, while simultaneously, a valve at the end of the cavity fill opens a path from the main cavity into a secondary or overflow cavity. The incoming water displaces the melt, which is pushed into the secondary cavity. The secondary valve is closed for hold and pack. Water can be expelled through gravity or evaporation.

Flow process: A combination of the short-shot and overflow methods flushes water through the part for enhanced cooling. The mould cavity is partially filled, then water is introduced, pushing the material to the end of the fill. A valve opens at the end of the fill, and the water breaks through the melt and streams through the valve into a water-recirculation circuit.

Gas and Water Together Used in Injection Molding:

Both using gas and water in the process of injection molding for the method of manufacturing the air transfer apparatus or enclosure. For example, gas be used initially to form the hollow sections, then water to cool the material such as HDPE, and finally gas to exhaust the water.

Blow molding is a specialized type of plastic processing used to create parts which includes hollow sections in the part.

For example, to create a blow-molded product, the following steps are performed.

The mould is placed in a blow molding machine.

A parison (also known as a preform), which is a tube of plastic with one hole that allows air to funnel through, is heated until it becomes soft.

The molten parison is placed into a blow mould that is cooler in temperature.

An air tube is inserted into a hole in the parison.

The mould is closed, and the air inside the parison blows the molten material until the material forms to the shape of the mould.

Once the part has cooled, the mould opens and the completed part is ejected from the mould.

Injection Blow Molding is a process that involves melting material such as pellets, for example HDPE pellets, and then injecting it into a predesigned mould. Machines used for injection molding include a clamping unit and the injection unit. The process uses a parison that forms the basis for the finished product. The process entails transferring the parison/core rod into the blow molding unit of the machine, followed by inflating and cooling the pre-formed part. After cooling, the core rod is rotated to the ejection position, the mould is opened, and the product is removed. Throughout the process, three sets of core rods are used to facilitate mould injection, blow molding, and the ejection of the formed part.

Extrusion blow molding is a process of material being extruded or expelled into a hollow tube, known as a parison. A mould closes around the parison in order to shape the part while at a blow station. At the blow station, air or other gas or mixture of gases is blown into the parison inflating the parison into the shape of the mould. Once the material has cooled via a cooling system and/or apparatus, the mould is opened, and the part is extruded.

Extrusion:

Plastic extrusion manufacturing is a process in which a thermoplastic raw material, usually in the form of pellets, is melted and formed, under pressure, into a continuous shape or profile. The process is also very simple and divided into few stages. At first, a plastic extruder is heated to melt the solid polymer or HDPE so that it can be pumped and filled into a die where it takes its final and desired shape. The plasticized polymer then sets and retains the shape after being cooled. The extruder is also used to mix various ingredients like colors, fibers, mineral fillers, additives, and processing aids with the molten polymer. Also, the extruder performs disperses and distributes all constituents of the mixture evenly and adequately to provide with consistent mixture, pressure and temperature.

In general, an extrusion system has the following main components:

An automatic feeding and dosing mechanisms for inserting a preferred amount of polymer or HDPE and other components.

An extruder which melts and mixes the ingredients with molten polymer.

An effective filtration system to remove any contaminations.

A connector or adapter which connects the extruder to the die.

A die which transforms molten polymer into a desired shape.

A cooling mechanism and/or apparatus which cools down and sets the polymer to gain its final shape.

A puller which takes out the polymer from the die after the process is complete.

Electrofusion:

Electrofusion is a method of joining two separate parts/components using built-in electric heating elements which are used to weld a joint together.

3Dimensional Printing:

Three-Dimensional (3D) printing is an additive manufacturing process of making three dimensional objects from a digital file. The creation of a 3D printed object is achieved using additive processes. In an additive process, an object is created by laying down successive layers of material until the object is created. Each of these layers can be seen as a thinly sliced cross-section of the object.

HDPE Flame Spraying:

HDPE spraying onto a surface to form an HDPE coating.

The HDPE pellets are ground into the form of a powder and the HDPE material is deposited on any surface or surfaces of the air transfer apparatus or enclosure and/or the heat exchanger or on all surfaces of the air transfer apparatus or enclosure by using a flame spray. Prior to spraying, all surfaces are cleaned by a substance such as deionized water, alcohol and/or acetone. Optionally, the surfaces may be mechanically coarsened by sand blasting with a material such as alumina or sand. For the flame spraying, any known fuel gas such as acetylene may be used with a flow rate in the range of 0.5 $N/m^3/h$ to 2.5 $Nm^3/h$ and a pressure in the range of 0.01 MPa to 0.3 MPa. The pressure of oxygen is in the range of 0.03 MPa to 1.0 MPa and the flow rate of oxygen is in the range of 1.0 $Nm^3/h$ to 4 $Nm^3/h$. The feed rate of the HPDE powder is in the range of 10 g/min to 100 g/min. The spray distance from the nozzle exit to the surface(s) is 0.1 m to 0.3 m. It is noted that all the above values of the feed rates, flow rates and pressures can be lower and/or larger than disclosed above. Also, one or more additive components which include a flame-retardant material, an intumescent material, an antimicrobial agent, an ultraviolet light stabilizer, and a ceramic may be mixed with the HDPE powder or ground with the HDPE pellets forming a powder in order to provide further surface protection with the inherent properties of each additive component.

The flame-retardant additive may comprise a polymer, where the polymer is made by the incorporation of aromatic cycles or heterocycles, which lend rigidity and stability to the polymers. Examples of such flame retardant polymers made with aromatic heterocycles are polyimides, polybenzoxazoles (PBOs), polybenzimidazoles, and polybenzthiazoles (PBTs). The flame-retardant additive may comprise melamine-based flame retardants which include 1—Pure melamine, 2—melamine derivatives, i.e., salts with organic or inorganic acids such as boric acid, cyanuric acid, phosphoric acid or pyro/poly-phosphoric acid, and 3—melamine homologues such as melam, melem and melon. The flame-retardant additive may be a silicon-based flame retardant such as polydimethylsiloxane. The flame-retardant additive is added to the HDPE such the composition of HDPE and the flame-retardant additive meets the requirement Class A: Flame Spread 0-25; smoke-developed 0-450 or Class B: Flame Spread 26-75; smoke-developed 0-450 or Class C: Flame Spread 76-200; smoke-developed 0-450 under the National Fire Protection Agency (NFPA) 101® Life Safety Code® which is classified based on the standard test method for assessing the surface burning characteristics of building materials/products (i.e. ASTM E 84). The flame spread Index and Smoke Developed Index values obtained by the ASTM E 84 test are used by code officials and regulatory agencies in the acceptance of interior finish materials for various applications. The most widely accepted classification system is described in the National Fire Protection Association publication NFPA 101 Life Safety Code 1. 2006 International Building Code a. Section 803 Wall and Ceiling Finishes, Paragraph 803.1 General states, "Interior wall and ceiling finishes shall be classified in accordance with ASTM E-84. Such interior finish materials shall be grouped in the following classes in accordance with their flame spread and smoke-developed indexes. Class A: Flame Spread 0-25; smoke-developed 0-450.

The intumescent additive may be a waterproof sodium silicate or graphite.

The antimicrobial additive may be an organometallic, an isothiazolone, an organosulfur or a mercaptan.

The ultraviolet light stabilizer may be a hindered amine, a salicylate, a cyanoacrylate or a nickel chelate.

The air transfer apparatus or enclosure is monolithic manufactured or integrally manufactured or is manufactured by the combination of monolithically and integrally manufactured.

The present disclosure includes all inside surfaces of a monolithic or integral air transfer apparatus or enclosure manufactured from and/or comprise a non-porous material such as high-density polyethylene (HDPE) which prevents the formation of mold, mildew, calcination and deposits of metals on the inner surfaces of the air transfer apparatus or enclosure and/or heat exchanger(s) and therefore increases the cooling efficiency and the operational life of the air transfer apparatus or enclosure and the evaporative cooling system as well as lowers the cost of operating the air transfer apparatus or enclosure and evaporative cooling system by reducing the consumption of power to run the pumps, fans and other system components and by eliminating frequent cleaning and maintenance. The air transfer apparatus or enclosure is formed with at least one heat exchanger, such as an indirect heat exchanger pad or adapted to have at least one heat exchanger, such as an indirect heat exchanger pad and/or evaporative heat exchanger, therein and/or attached thereto. The at least one heat exchanger is made from and/or comprise a non-porous material such as high-density polyethylene (HDPE). Therefore, all inside surfaces of the air transfer apparatus or enclosure are made from and/or comprise a non-porous material such as high-density polyethylene (HDPE) and not made from metal. Moreover, a heat exchanger can be installed on any one side or any more than one side (the sides include a left side, a right side, a front side, a back side and the top of the air transfer apparatus) of the air transfer apparatus. However, in view of a desired application or of a desired heat load, the heat exchanger, such as an indirect heat exchanger pad, may be made from a material, other than HDPE, such as an alloy, a thermally conductive composite material or a metal. The thermally conductive composite material may have thermally conductive fibers therein. The thermally conductive fibers may be randomly distributed within the thermally conductive composite material or may be uniformly distributed within the thermally conductive composite material or may be randomly distributed in a certain area or areas within the thermally conductive composite material and be uniformly distributed within the thermally conductive composite material in a different area or areas than the area(s) of the randomly distributed thermally conductive fibers. Moreover, the spacing of the thermally conductive fibers may be closer together in an area or areas in the thermally conductive composite material than in another area or areas of the thermally conductive composite material in order to provide more heat transfer within a desired area or areas of the heat exchanger.

Additionally, the present disclosure and invention includes a monolithic air transfer apparatus or enclosure that is an integral or a monolithic structure or enclosure with an integral cavity and/or other cavities (i.e. the monolithic air transfer apparatus or enclosure and the cavity and other cavities are formed and/or manufactured from a single piece of material, i.e. one piece, such that the cavity and/or cavities are formed out of the monolithic air transfer apparatus or enclosure instead of the monolithic air transfer apparatus or enclosure being formed from a plurality of parts). The monolithic air transfer apparatus or enclosure being an integral or a monolithic structure or enclosure solves the problem of preventing water and air leaks and prevents the monolithic structure or enclosure from obtaining cracks due to different material expansion rates and from "pulling apart" due to no joints such as solder, welding or other connected and assembled joints. This also reduces costs of shipping, manufacturing and installation of the air transfer apparatus and reduces the time to manufacture and install the monolithic air transfer apparatus or enclosure because a plurality of apparatus including valves, pumps and motors are installed within the integral cavity and/or cavities after the manufacturing (i.e. after the air transfer apparatus or enclosure is made) of the air transfer apparatus or enclosure but before (i.e. pre-installed) within the integral cavity and/or cavities prior to the site/location installation of the air transfer apparatus or enclosure. Also, the integrated cavity and/or cavities reduces the noise heard from the pumps and motors because the cavity and/or cavities dampens the sound heard outside of the cavity and/or cavities and therefore the monolithic air transfer apparatus or enclosure with the integral cavity and/or cavities solves the problem of being able to install the monolithic air transfer apparatus or enclosure in an environment which requires little or no noise.

Preferably, the method of manufacturing the monolithic air transfer apparatus or enclosure is injection molding such as air-assisted injection molding or liquid such as water injection molding. The air transfer apparatus or enclosure is made from and/or comprise high-density polyethylene (HDPE) in order to solve the problem of mold, mildew, calcination and deposits of metals forming on the inner surface of the cooling tower because if all inside surfaces of the cooling tower are made from and/or comprise HDPE then mold, mildew, calcination and deposits of metals including alkaline earth metals and/or other metals are prevented from forming on the inner surfaces of the cooling tower and this prevention of mold, mildew, calcination and deposits of metals increases the cooling efficiency during the operational life of the monolithic and/or integral air transfer apparatus or enclosure (i.e. a cooling tower) and the evaporative cooling system.

High-density polyethylene (HDPE) or polyethylene high-density (PEHD) is a thermoplastic polymer produced from the monomer ethylene. One example of HPDE which is used is a Marine Grade HDPE such as SEABOARD™ or STAR-BOARD™ made by Ridout Plastics Co. Inc. The Marine Grade HDPE can be the color of polar white or any other known color. The Marine grade HDPE has superior scratch and impact resistance, high stiffness, is ultraviolet (UV) stabilized, will not delaminate, chip, rot, or swell, is easy to machine with standard tooling, is a low energy material and has no moisture absorption, is easy to clean and is FDA and USDA approved with UV additive. The thickness used on all surfaces of the cooling tower of the Marine Grade HDPE is in the range of one sixteenth of an inch to six inches or can be smaller than one sixteenth of an inch or can be larger than six inches. The above characteristics and benefits are needed and required to make the disclosed monolithic and/or integral air transfer apparatus or enclosure prevent the formation of mold, mildew, calcination and deposits of metals, prevent thermal warping and increase the cooling efficiency during the operational life of the monolithic and/or integral air transfer apparatus or enclosure and the evaporative cooling system.

Polyesters are formed by polyalkylene terephthalates having alkyl groups or radicals comprising 2 to 10 carbon atoms and polyalkylene terephthalates having alkyl groups or radicals containing 2 to 10 carbon atoms which are interrupted by 1 or 2 —O—. Further, polyesters can be polyalkylene terephthalates having 5 alkyl groups or radicals containing 2 to 4 carbon atoms.

Examples of polyolefin materials are polyethylenes (PE) which include high density polyethylene (HDPE) having a density greater than 0.944 g/cm$^3$, medium density polyethylene (MDPE) having a density in the range of 0.926 g/cm$^3$ to 0.940 g/cm$^3$, low density polyethylene (LDPE) having a density in the range of 0.910 g/cm$^3$ to 0.925 g/cm$^3$, in the form of nonoriented sheets (PE sheet) or monoaxially or biaxially oriented sheets (oPE sheet), polypropylenes (PP), such as axially or biaxially oriented polypropylene (oPP sheet) or cast polypropylene (cPP sheet), amorphous or crystalline polypropylene or blends thereof or atactic or isotactic polypropylene or blends thereof, poly(1-butene), poly(3-methylbutene), poly(4 methylpentene) and copolymers thereof, then polyethylene with vinyl acetate, vinyl alcohol or acrylic acid, such as, for example, ionomer resins, such as copolymers of ethylene, of acrylic acid, of methacrylic acid, of acrylic esters, tetrafluoroethylene or polypropylene, in addition random copolymers, block copolymers or olefin polymer/elastomer blends. The polyolefin materials can also comprise cycloolefins as monomer of a homopolymer or of copolymers.

The disclosed invention can have all inside surfaces of the air transfer apparatus or enclosure being high-density polyethylenes.

However, polypropylenes and ionomers having the density of the range of HPDE, may be used on all inside surfaces of the air transfer apparatus or enclosure.

Examples of polyamides (PA) for the plastics sheets are composed, for example, of polyamide 6, ε-caprolactam homopolymer (polycaprolactam); polyamide 11; polyamide 12, ω-lauryllactam homopolymer (polylauryllactam); polyamide 6,6, homopolycondensate of hexamethylenediamine and of adipic acid (poly(hexamethylene adipamide)); polyamide 6,10, homopolycondensate of hexamethylenediamine and of sebacic acid (poly(hexamethylene sebacamide)); polyamide 6,12, homopolycondensate of hexamethylenediamine and of dodecanedioic acid (poly(hexamethylene dodecanamide)) or polyamide 6-3-T, homopolycondensate of trimethylhexamethylenediamine and of terephthalic acid (poly(trimethylhexamethylene terephthalamide)), and blends thereof. The polyamide sheets are drawn monoaxially or biaxially (oPA).

One of many benefits of HDPE is from HDPE's inherent malleability such a being meltable and moldable as well as being a low-cost material. HDPE has a high melting point which is in the range of 239° F.-275° F. and therefore, HDPE remains rigid at very high temperatures. However, once HDPE reaches its melting point, the HDPE material can be quickly and efficiently molded for use. Moreover, HDPE can be shaped and/or made into any desired geometric or polygonal shape by using, for example, molding, injection molding, gas assisted injection molding, liquid/water assisted injection molding, blow molding, extruding, electrofusion, 3-D printing or any other equivalent method. Additionally, HDPE is corrosion resistance. HDPE resists mold, mildew and rotting, making HDPE the ideal material for being used in the monolithic air transfer apparatus or enclosure, which is exposed to water, due to the HDPE resisting mold and mildew which results in low maintenance and very low frequent cleaning of the monolithic air transfer apparatus or enclosure as compared to conventional cooling towers. HDPE is long-lasting and weather-resistant and can be sterilized by boiling. Additionally, HDPE can withstand most strong mineral acids and bases and has excellent resistance to naturally occurring chemicals. Moreover, the material of HDPE is non-porous and virtually impervious to most common chemicals, water, solvents, acids, detergents, and cleaning fluids. Therefore, calcination and metals from water are prevented from forming on the surface of HDPE.

HDPE has a large strength to density ratio. HDPE's linear structure means the material has little branching, which offers HDPE stronger intermolecular forces and tensile strength than MDPE and LDPE. HDPE plastic is easily recyclable and therefore reduces non-biodegradable waste from being introduced into landfills and helps reduce plastic production.

One example of a cooling system which the air transfer apparatus or enclosure can be used is disclosed below. At least one indirect heat exchanger pad comprises a plurality of heat exchanger passages and by the use of at least one cooling tower fan, ambient hot air passes through the plurality of heat exchanger passages and a fluid from above the at least one indirect heat exchanger pad flows down and over the surfaces of the at least one indirect heat exchanger pad, including the plurality of heat exchanger passages, and makes direct contact with the ambient hot air. Therefore, the monolithic and/or integral air transfer apparatus or enclosure has cooled the ambient hot air. The now cooled ambient or outside air then flows through at least one outlet of the monolithic and/or integral air transfer apparatus or enclosure.

The cooling tower fan is a motorized impeller variable frequency drive (VFD) fan. Therefore, the outside air is pulled through the at least one indirect heat exchanger pad from outside of the monolithic and/or integral air transfer apparatus or enclosure to inside the cooling tower. The fluid, which has now flowed through the plurality of heat exchanger passages of the at least one indirect heat exchanger pad, exits the plurality of heat exchanger passages and is collected in a bottom portion of the monolithic and/or integral air transfer apparatus or enclosure. The bottom portion of the monolithic and/or integral air transfer apparatus or enclosure has a slanted or curved shape which enables the collected fluid exiting the at least one indirect heat exchanger pad to flow to a middle section of the bottom portion of the monolithic and/or integral air transfer apparatus or enclosure where the collected fluid flows through an opening in the middle section where this collected fluid is pumped via a circulating pump(s) to an indirect cooling heat exchanger such as a coil type of heat exchanger.

A plurality of conduit apertures is located within a bottom of a conduit, where the conduit is located above the bottom portion of the monolithic and/or integral air transfer apparatus or enclosure so as to provide automatic cleaning of the monolithic and/or integral air transfer apparatus or enclosure.

A dump or drain valve and a filter are fluidly connected to the opening in the middle section and is located upstream from the circulating pump or pumps in order to remove dirt or sediment from the collected fluid which has flowed through the opening in the middle section of the bottom portion of the monolithic and/or integral air transfer apparatus or enclosure. The filter can be a Y-strainer type filter or any type of known filter. The type of valves used can be any known type of valve.

A drain is attached to the bottom portion of the monolithic and/or integral air transfer apparatus or enclosure and is in fluid connection with the collected fluid in order to remove and/or drain the collected fluid from the bottom portion of the monolithic and/or integral air transfer apparatus or enclosure at any desired time.

A door panel can be located on one side and/or on a bottom of the monolithic and/or integral air transfer apparatus or enclosure in order to easily access the circulating pump or pumps and/or any other apparatus.

The circulating pump(s) is/are a seal less magnetically drive pump and also is a variable frequency drive (VFD) pump. The circulating pump(s) can operate in the range of one to two amps, or more than two amps if necessary, which dramatically reduces operating costs and still meets the cooling systems load requirement. All of the inner surfaces of the fluid passages through which the collected fluid flows through the circulating pump(s) are not metal in order to solve the problem of calcium, alkaline earth metals and/or other metals forming on the surface of the fluid passages. Therefore, all of the inner surfaces of the fluid passages in the circulating pump(s) which the collected fluid flows through are made of a non-porous material such as high-density polyethylene (HDPE) because HDPE resists mold, mildew and well as prevents calcination and the formation of metal deposits. However, the circulating pump(s) can be any pump which has inner surfaces of the fluid passages in the circulating pump(s) being made of a non-porous material such as high-density polyethylene (HDPE).

Since the cooling tower fan is a variable frequency drive (VFD) fan and the circulating pump is a variable frequency drive (VFD) pump, the cooling tower fan and the circulating pump(s) can be operated in conjunction with each other and at low speeds and low amperage in order to satisfy the requirements of the cooling capacity given an outside air temperature in order to increase the monolithic and/or integral air transfer apparatus or enclosure and cooling systems efficiency because operating the cooling tower fan and/or the circulating pump(s) at low speeds lowers air velocity and fluid pump flow and therefore increases the time (i.e. dwell time) the air and fluid are within the heat exchanges which increases the heat transfer effectiveness significantly while reducing the electric power to the cooling tower fan and/or the circulating pump(s).

At a top portion of the at least one indirect heat exchanger pad, a distribution apparatus is positioned above the top portion of the at least one indirect heat exchanger pad and a fluid line is fluidly connected to and pressurized by the circulating pump. The fluid line is integrally formed within the monolithic and/or integral air transfer apparatus or enclosure by one of the above disclosed manufacturing methods such as injection molding, gas and/or water assisted as injection molding and the fluid line is fluidly connected to the distribution apparatus from inside the monolithic and/or integral air transfer apparatus or enclosure, so the fluid is not in direct contact with the sun and is prevented from being heated by the direct rays or other hot elements from outside of the monolithic and/or integral air transfer apparatus or enclosure. The distribution apparatus can have an open bottom and a distribution plate fastened to the distribution apparatus which has a plurality of holes and the plurality of holes are arranged in a staggered arrangement or random arrangement so as to evenly allow the pressurized fluid to flow through the plurality of holes onto the outer surface of the at least one indirect heat exchanger pad. However, the distribution apparatus can have a bottom surface comprising a plurality of holes therein, which allows for not having a distribution plate, and the plurality of holes are arranged in a staggered arrangement or random arrangement so as to evenly allow the pressurized fluid to flow through the plurality of holes onto the outer surface of the at least one indirect heat exchanger pad. The distribution apparatus is in the same shape as the top portion of the at least one indirect heat exchanger pad in order to fully coat all surfaces of the at least one indirect heat exchanger pad with a fluid. Therefore, the distribution apparatus is in the general shape of a rectangle where the sides and top of the distribution apparatus form a fluid tight apparatus and the bottom of the distribution apparatus allows a fluid to pass therethrough. At least one side of the distribution apparatus has a fluid inlet for the fluid pumped via the circulating pump(s) to enter the distribution apparatus. Therefore, the top and all sides of the distribution apparatus, except for the portion of the side which has the fluid inlet, do not allow passage of a fluid (i.e. are closed to atmospheric air).

By having the fluid being introduced into the distribution apparatus under pressure (i.e. more than atmospheric pressure) by the circulating pump, as opposed to having the fluid operating under atmospheric pressure solves the problem of being able to either increase or decrease the flow rate over the outer surfaces of the at least one indirect heat exchanger pad. Furthermore, since the fluid is pressurized by the circulating pump(s), this has allowed Applicant to create hole sizes within the distribution apparatus such that the fluid level within the distribution apparatus stays at a constant level and/or maintains a level such that the outer surfaces of the at least one indirect heat exchanger pad are always fully coated or saturated during use. The holes can be round, circular or any geometric or polygon shape. The size of the holes can have a diameter of one sixteenth of an inch to four inches. However, the hole diameters can be smaller than one sixteenth of an inch or larger than four inches. If the opening of the holes is not circular in shape, then the holes opening can be one sixteenth of an inch to four inches or can be smaller than one sixteenth of an inch or larger than four inches. The holes may all have the same size or may have different sizes in order to create hole sizes within the distribution apparatus such that the fluid level within the distribution apparatus stays at a constant level and/or maintains a level such that the outer surfaces of the at least one indirect heat exchanger pad are always fully coated or saturated during use.

A fluid channel device is located on the bottom portion of the cooling tower and is integrally formed during the manufacturing process, such as injection molding, to the bottom portion of the monolithic air transfer apparatus or enclosure. The fluid channel device is positioned on the bottom portion of the monolithic and/or integral air transfer apparatus or enclosure such that the opening in the middle section of the bottom portion of the cooling tower is covered by the fluid channel device. Additionally, the fluid channel device has a plurality of channels spaced along the length of the fluid channel device. The channels may have an elongated shape, a circular shape or any geometric or polygonal shape such that the collected fluid flows into the plurality of channels. The shape of the channels is designed such that the height of the channels allows the coldest lower level portion of the collected fluid to flow therethrough and is designed such that when the circulating pump is operating at maximum power and flow rate, the collected fluid flows through the plurality of channels at a flow rate such that the indirect heat exchanger pads are being maintained fully saturated (i.e. the outside surface of the indirect heat exchanger pads are not devoid of a fluid) when the monolithic and/or integral air transfer apparatus or enclosure and system are operational. The height and/or shape of the channels may all be same or some channels may have the same shape and other channels may have a different shape such that when the circulating pump(s) is/are operating at maximum power and flow rate, the collected fluid flows through the plurality of channels at a flow rate such that the at least one indirect heat exchanger pad is/are being maintained fully saturated. Also, the height of the channels may all be the same or some channels may have the same height and other channels may have a different height such that when the circulating pump(s) is/are operating at maximum power and flow rate, the collected fluid flows through the plurality of channels at a flow rate such that the at least one indirect heat exchanger pad is/are being maintained fully saturated. The height of the channels is the maximum distance between the bottom portion of the monolithic and/or integral air transfer apparatus or enclosure to the void of material in the fluid channel device which forms the channel.

The shape of the monolithic and/or integral air transfer apparatus or enclosure can be square, rectangular, circular or any geometric or polygonal shape. The size of the monolithic and/or integral air transfer apparatus or enclosure can have a length, width and height (or effective length, width and height when the length, width and height are in a non-rectilinear shape) each from one foot up to 1000 feet or can be smaller than one foot and larger than 1000 feet depending on the desired application and use. Moreover, the diameter or hydraulic diameter of the monolithic and/or integral air transfer apparatus or enclosure can be from one foot up to 1000 feet or can be smaller than one foot and larger than 1000 feet depending on the desired application and use.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without inventive effort.

DETAILED DESCRIPTION

The technical solutions of the present disclosure will be clearly and completely described below with reference to the drawings. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link", "attached" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

FIGS. 1-16 illustrate the present invention of an indirect-direct evaporative cooling (IDEC) apparatus/system including a monolithic and/or integral air transfer apparatus or enclosure 200 and a method of manufacturing the monolithic and/or integral air transfer apparatus or enclosure 200.

The below disclosed monolithic and/or integral air transfer apparatus or enclosure 200 and cooling system uses one hundred percent fresh ambient or outside air as the air supplied to a building or space which desires cool air. However, depending on the requirement for cooling, pre-conditioned air may be combined with the ambient or outside air for the air to be used for cooling a building or space.

Figure 1:
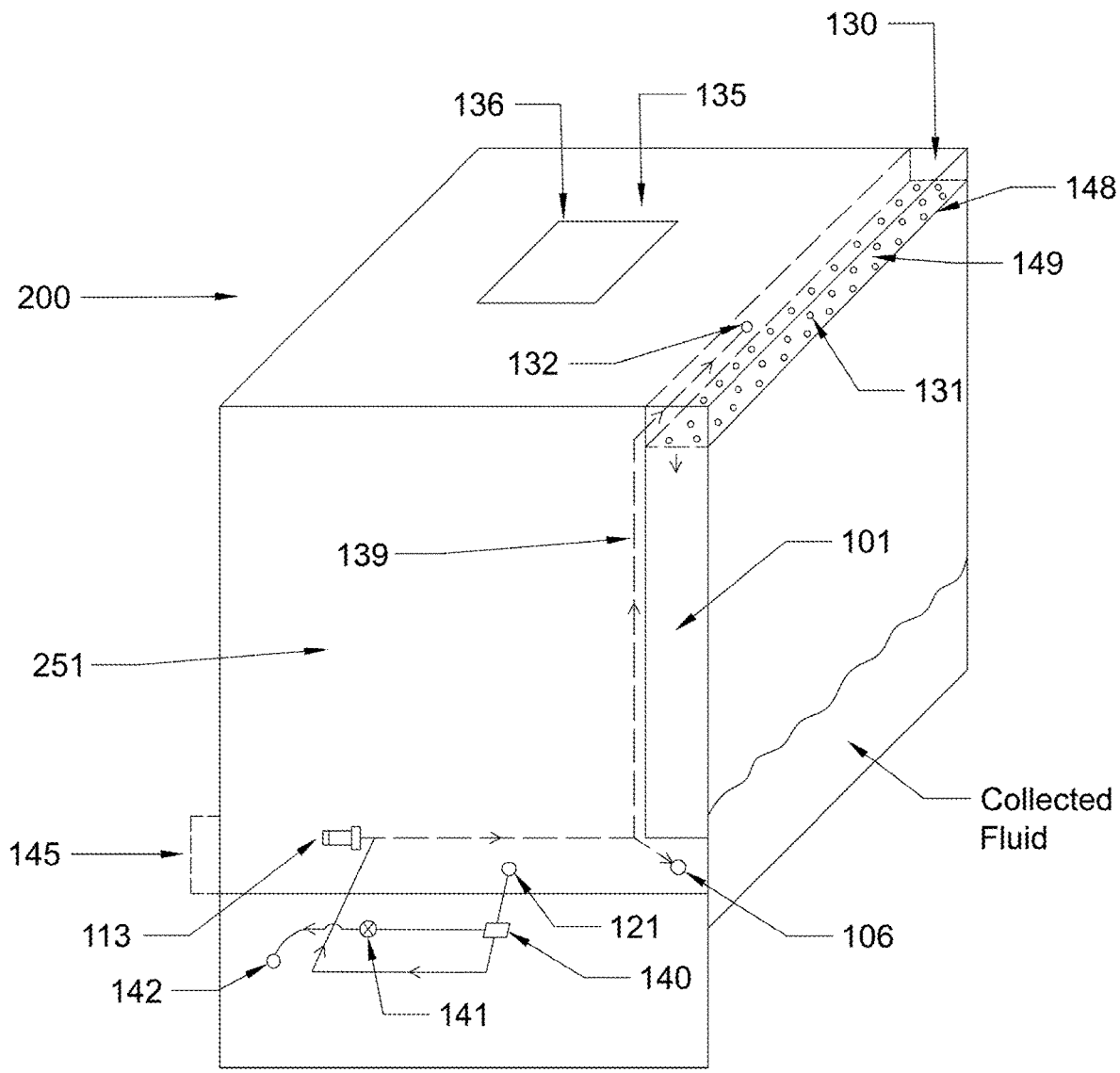
FIG. 1 is a perspective view of a monolithic and/or integral air transfer apparatus or enclosure in the form of a box shape and illustrating only one side having an indirect heat exchanger pad with a distribution apparatus.

As shown in FIG. 1, the monolithic and/or integral air transfer apparatus or enclosure 200 is in the general shape of a square or is box shaped having an internal cavity 251. However, the shape of the monolithic and/or integral air transfer apparatus or enclosure 200 can be any geometrical or polygonal shape. The monolithic and/or integral air transfer apparatus or enclosure 200 has a height in the range of two feet to one hundred feet; a width in the range of two feet to one hundred feet; and a depth in the range of two feet to one hundred feet. As needed, the above height, width and depth ranges of the monolithic and/or integral air transfer apparatus or enclosure 200 may be smaller and/or larger than the above disclosed ranges in order to meet design and cooling demands. As shown in FIG. 1, the monolithic and/or integral air transfer apparatus or enclosure 200 is comprised of a front side which can have an access door if needed; a top 135 which may or may not have an aperture 136 therein; a bottom portion; a back side which is opposite the front side; two sides (left and right sides); and at least one indirect heat exchanger pad 101 can be integral or incorporated into the monolithic and/or integral air transfer apparatus by integrally forming the at least one indirect heat exchanger pad 101 within the monolithic and/or integral air transfer apparatus or enclosure 200 in any of the manufacturing methods of molding, injection molding, gas assisted injection molding, liquid/water assisted injection molding, blow molding, extruding, electrofusion, 3-D printing or any other equivalent method. The at least one indirect heat exchanger pad 101 can be incorporated into the monolithic and/or integral air transfer apparatus by attaching the at least one indirect heat exchanger pad 101 within/to the monolithic and/or integral air transfer apparatus or enclosure 200. The at least one indirect heat exchanger pad 101 can be fixed or rotatory attached to a top surface or a bottom surface or both a top surface and a bottom surface of the monolithic and/or integral air transfer apparatus or enclosure 200. The at least one indirect heat exchanger pad 101 being fixed attached to a top surface or a bottom surface or both a top surface and a bottom surface of the monolithic and/or integral air transfer apparatus or enclosure 200 is by electrofusion welding, or fixed with fasteners such as screws, rivets or equivalent fixed attaching devices. The at least one indirect heat exchanger pad 101 being rotatory attached to a top surface or a bottom surface or both a top surface and a bottom surface of the monolithic and/or integral air transfer apparatus or enclosure 200 is by any known rotating apparatus and/or device such as a socket and ball bearing or equivalent rotating attachment apparatus and/or device.

The indirect heat exchanger pad 101 can be located on one side or more than one side (i.e. on a left side, a right side, a back side, a front side or even the top 135) of the monolithic and/or integral air transfer apparatus or enclosure 200). Each indirect heat exchanger pad 101 can have the general shape of a rectangle. However, the shape of the indirect heat exchanger pads 101 can be any geometrical or polygonal shape. The indirect heat exchanger pads 101 may have a height in the range of two feet to twelve feet; a width in the range of two feet to twelve feet; and a depth in the range of two feet to twelve feet. As needed, the above height, width and depth ranges of the indirect heat exchanger pads 101 may be smaller and/or larger than the above disclosed ranges in order to meet design and cooling demands. Also, the height of the indirect heat exchanger pads 101 installed in or integrally formed from the monolithic and/or integral air transfer apparatus or enclosure 200 may be in the range of one to one hundred feet.

All inside/internal surfaces of the monolithic and/or integral air transfer apparatus or enclosure 200 such as the internal walls of monolithic and/or integral air transfer apparatus or enclosure 200 are made from a non-porous material and/or comprising a non-porous material and not metal. Preferably, all inside surfaces of the monolithic and/or integral air transfer apparatus or enclosure 200, as well as for the surfaces of the indirect heat exchanger pads, are made from and/or comprise high-density polyethylene (HDPE) in order to solve the problem of mold, mildew, calcination and deposits of metals forming on the inner surface of the monolithic and/or integral air transfer apparatus or enclosure 200 because if all inside surfaces of the monolithic and/or integral air transfer apparatus or enclosure 200 are made from and/or comprise HDPE then mold, mildew, calcination and deposits of metals including alkaline earth metals and/or other metals are prevented from forming on the inner surfaces of the monolithic and/or integral air transfer apparatus or enclosure 200 and this prevention of mold, mildew, calcination and deposits of metals increases the cooling efficiency during the operational life of the monolithic and/or integral air transfer apparatus or enclosure 200 and the evaporative cooling system. The non-porous surfaces can be made by the manufacturing methods of molding, injection molding, gas assisted injection molding, liquid/water assisted injection molding, blow molding, extruding, electrofusion, 3-D printing or any other equivalent method. The surfaces, including the heat transfer plates/cells of the indirect heat exchanger pads 101 are made from and/or comprise a non-porous material such as high-density polyethylene (HDPE). Therefore, all inside surfaces of the monolithic and/or integral air transfer apparatus or enclosure 200 are made from and/or comprise a non-porous material such as high-density polyethylene (HDPE) and not made from metal.

High-density polyethylene (HDPE) or polyethylene high-density (PEHD) is a thermoplastic polymer produced from the monomer ethylene. One example of HPDE which is used is a Marine Grade HDPE such as SEABOARD™ or STARBOARD™ made by Ridout Plastics Co. Inc. The Marine Grade HDPE can be the color of polar white or any other known color. The Marine grade HDPE has superior scratch and impact resistance, high stiffness, is ultraviolet (UV) stabilized, will not delaminate, chip, rot, or swell, is easy to machine with standard tooling, is a low energy material and has no moisture absorption, is easy to clean and is FDA and USDA approved with UV additive. The thickness used on all surfaces of the monolithic and/or integral air transfer apparatus or enclosure 200 of the Marine Grade HDPE is in the range of one sixteenth of an inch to six inches. The above characteristics and benefits are needed and required to make the disclosed monolithic and/or integral air transfer apparatus or enclosure 200 prevent the formation of mold, mildew, calcination and deposits of metals, prevent thermal warping and increase the cooling efficiency during the operational life of the monolithic and/or integral air transfer apparatus or enclosure 200 and the evaporative cooling system.

Polyesters are formed by polyalkylene terephthalates having alkyl groups or radicals comprising 2 to 10 carbon atoms and polyalkylene terephthalates having alkyl groups or radicals containing 2 to 10 carbon atoms which are interrupted by 1 or 2 —O—. Further, polyesters can be polyalkylene terephthalates having 5 alkyl groups or radicals containing 2 to 4 carbon atoms.

Examples of polyolefin materials are polyethylenes (PE) which include high density polyethylene (HDPE) having a density greater than 0.944 g/cm$^3$, medium density polyethylene (MDPE) having a density in the range of 0.926 g/cm$^3$ to 0.940 g/cm$^3$, low density polyethylene (LDPE) having a density in the range of 0.910 g/cm$^3$ to 0.925 g/cm$^3$, in the form of nonoriented sheets (PE sheet) or monoaxially or biaxially oriented sheets (oPE sheet), polypropylenes (PP), such as axially or biaxially oriented polypropylene (oPP sheet) or cast polypropylene (cPP sheet), amorphous or crystalline polypropylene or blends thereof or atactic or isotactic polypropylene or blends thereof, poly(1-butene), poly(3-methylbutene), poly(4 methylpentene) and copolymers thereof, then polyethylene with vinyl acetate, vinyl alcohol or acrylic acid, such as, for example, ionomer resins, such as copolymers of ethylene, of acrylic acid, of methacrylic acid, of acrylic esters, tetrafluoroethylene or polypropylene, in addition random copolymers, block copolymers or olefin polymer/elastomer blends. The polyolefin materials can also comprise cycloolefins as monomer of a homopolymer or of copolymers.

The disclosed invention has on all inside surfaces of the monolithic and/or integral air transfer apparatus or enclosure 200 high-density polyethylenes. However, polypropylenes and ionomers having the density of the range of HPDE may be used on all inside surfaces of the monolithic and/or integral air transfer apparatus or enclosure 200.

Examples of polyamides (PA) for the plastics sheets are composed, for example, of polyamide 6, ε-caprolactam homopolymer (polycaprolactam); polyamide 11; polyamide 12, ω-lauryllactam homopolymer (polylauryllactam); polyamide 6,6, homopolycondensate of hexamethylenediamine and of adipic acid (poly(hexamethylene adipamide)); polyamide 6,10, homopolycondensate of hexamethylenediamine and of sebacic acid (poly(hexamethylene sebacamide)); polyamide 6,12, homopolycondensate of hexamethylenediamine and of dodecanedioic acid (poly(hexamethylene dodecanamide)) or polyamide 6-3-T, homopolycondensate of trimethylhexamethylenediamine and of terephthalic acid (poly(trimethylhexamethylene terephthalamide)), and blends thereof. The polyamide sheets are drawn monoaxially or biaxially (oPA).

One of many benefits of HDPE is from HDPE's inherent malleability such a being meltable and moldable as well as being a low-cost material. HDPE has a high melting point which is in the range of 239° F.-275° F. and therefore, HDPE remains rigid at very high temperatures. However, once HDPE reaches its melting point, the HDPE material can be quickly and efficiently molded for use. Moreover, HDPE can be shaped and/or made into any desired geometric or polygonal shape by using, for example molding, injection molding, gas assisted injection molding, liquid/water assisted injection molding, blow molding, extruding, electrofusion, 3-D printing or any other equivalent method. Additionally, HDPE is corrosion resistance. HDPE resists mold, mildew and rotting, making HDPE the ideal material for being used in the monolithic and/or integral air transfer apparatus or enclosure 200, which is exposed to water, due to the HDPE resisting mold and mildew which results in low maintenance and less frequent cleaning of the monolithic and/or integral air transfer apparatus or enclosure 200 when compared to conventional metal and porous cooling towers. HDPE is long-lasting and weather-resistant and can be sterilized by boiling. Additionally, HDPE can withstand most strong mineral acids and bases and has excellent resistance to naturally occurring chemicals. Moreover, the material of HDPE is non-porous and virtually impervious to most common chemicals, water, solvents, acids, detergents, and cleaning fluids. Therefore, calcination and metals from water are prevented from forming on the surface of HDPE.

HDPE has a large strength to density ratio. HDPE's linear structure means the material has little branching, which offers HDPE stronger intermolecular forces and tensile strength than MDPE and LDPE. HDPE plastic is easily recyclable and therefore reduces non-biodegradable waste from being introduced into landfills and helps reduce plastic production.

One example of an evaporative cooling system which includes the monolithic and/or integral air transfer apparatus or enclosure 200 can be used is disclosed below.

Figure 4:
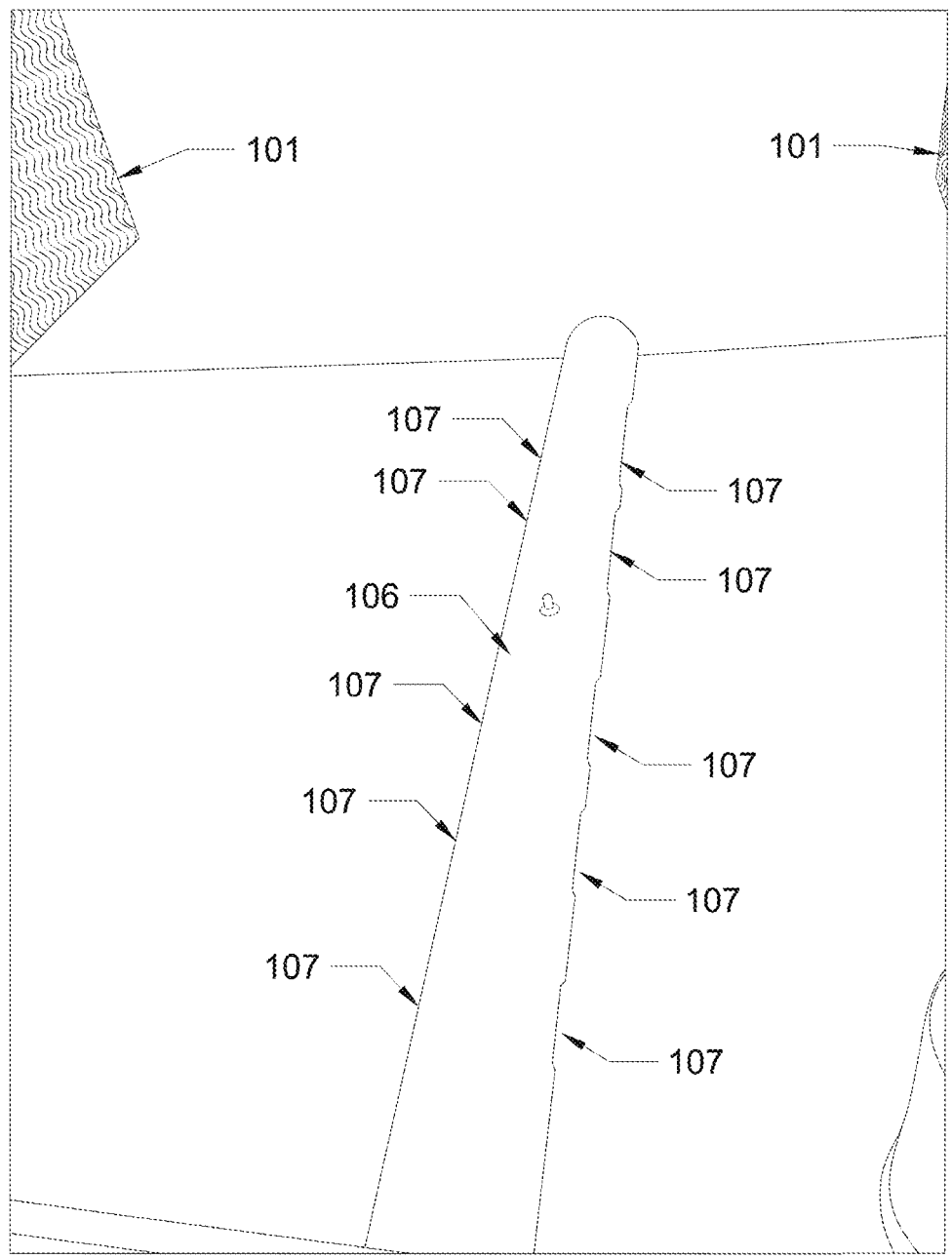
FIG. 4 is a schematic top perspective view illustrating the fluid channel device in a middle section of the bottom portion inside the monolithic and/or integral air transfer apparatus or enclosure.

As shown in FIG. 1, ambient or outside air is forced through each of the indirect heat exchanger pads 101 via the cooling tower fan or a plurality of cooling fans and a cooling fluid such as water flows over outer surfaces of the indirect heat exchanger pads 101 which cools the hot ambient air and moist air exits the monolithic and/or integral air transfer apparatus or enclosure 200 through aperture 136. The cooling tower fan is a motorized impeller variable frequency drive (VFD) fan. Therefore, the outside air is pulled through the indirect heat exchanger pads 101 from outside of the monolithic air transfer apparatus or enclosure 200 to inside the monolithic and/or integral air transfer apparatus or enclosure 200. The cooling fluid, such as water flows, which has now flowed over the outer surface of the indirect heat exchanger pads 101, exits the indirect heat exchanger pads 101 via the force of gravity and is collected in a bottom portion of the monolithic and/or integral air transfer apparatus or enclosure 200. As shown in FIG. 1 and FIG. 4, the bottom portion of the monolithic and/or integral air transfer apparatus or enclosure 200 has a slanted or curved shape which enables the collected cooling fluid exiting the indirect heat exchanger pads 101 to flow to a middle section of the bottom portion of the monolithic and/or integral air transfer apparatus or enclosure 200 where the fluid flows through channels 107 and is collected and pumped via a circulating pump 113 to a distribution apparatus 130 and/or an heat exchanger such as a heat exchanger coil.

As illustrated in FIG. 1, a dump or drain valve 141 and a filter 140 are fluidly connected in an opening in the middle section and is located upstream from the circulating pump 113 in order to remove dirt or sediment from the collected fluid which has flowed through the opening in the middle section of the bottom portion of the monolithic and/or integral air transfer apparatus or enclosure 200. A drain 142 is located downstream of the dump or drain valve 141. The filter can be a Y-strainer type filter or any type of known filter. The type of valves used can be any known type of valve.

The circulating pump 113 is a seal less magnetically driven pump and also is a variable frequency drive (VFD) pump. The circulating pump 113 can operate in the range of one to two amps, or more than two amps if needed, which decreases operating costs and still meet the cooling systems load requirement due to using less power than conventional cooling systems. All of the inner surfaces of the fluid passages through which the collected fluid flows through the circulating pump 113 is not metal in order to solve the problem of calcium, alkaline earth metals and/or other metals forming on the surface of the fluid passages. Therefore, all of the inner surfaces of the fluid passages in the circulating pump 113 which the collected fluid flows through are made of a non-porous material such as high-density polyethylene (HDPE) because HDPE resists mold, mildew and well as prevents calcination and the formation of metal deposits. However, the circulating pumps can be any pump which has inner surfaces of the fluid passages in the circulating pump being made of a non-porous material such as high-density polyethylene (HDPE).

Since the cooling tower fan is a motorized impeller variable frequency drive (VFD) fan, the at least one cooling fan is a motorized impeller variable frequency drive (VFD) fan and the circulating pump 113 is a variable frequency drive (VFD) pump, the cooling tower fan, the at least one cooling fan and the circulating pump 113 can be operated in conjunction with each other and at low speeds and low amperage in order to satisfy the requirements of the cooling capacity given an outside air temperature in order to increase the monolithic and/or integral air transfer apparatus or enclosure 200 and cooling systems efficiency because operating the cooling tower fan, and/or the at least one cooling fan and/or the circulating pump 113 at low speeds lowers air velocity and fluid pump flow and therefore increases the time (i.e. dwell time) the air and fluid are within the heat exchanger which increases the heat transfer effectiveness significantly while reducing the electric power to the cooling tower fan, the at least one cooling fan and/or the circulating pump 113.

Figure 2:
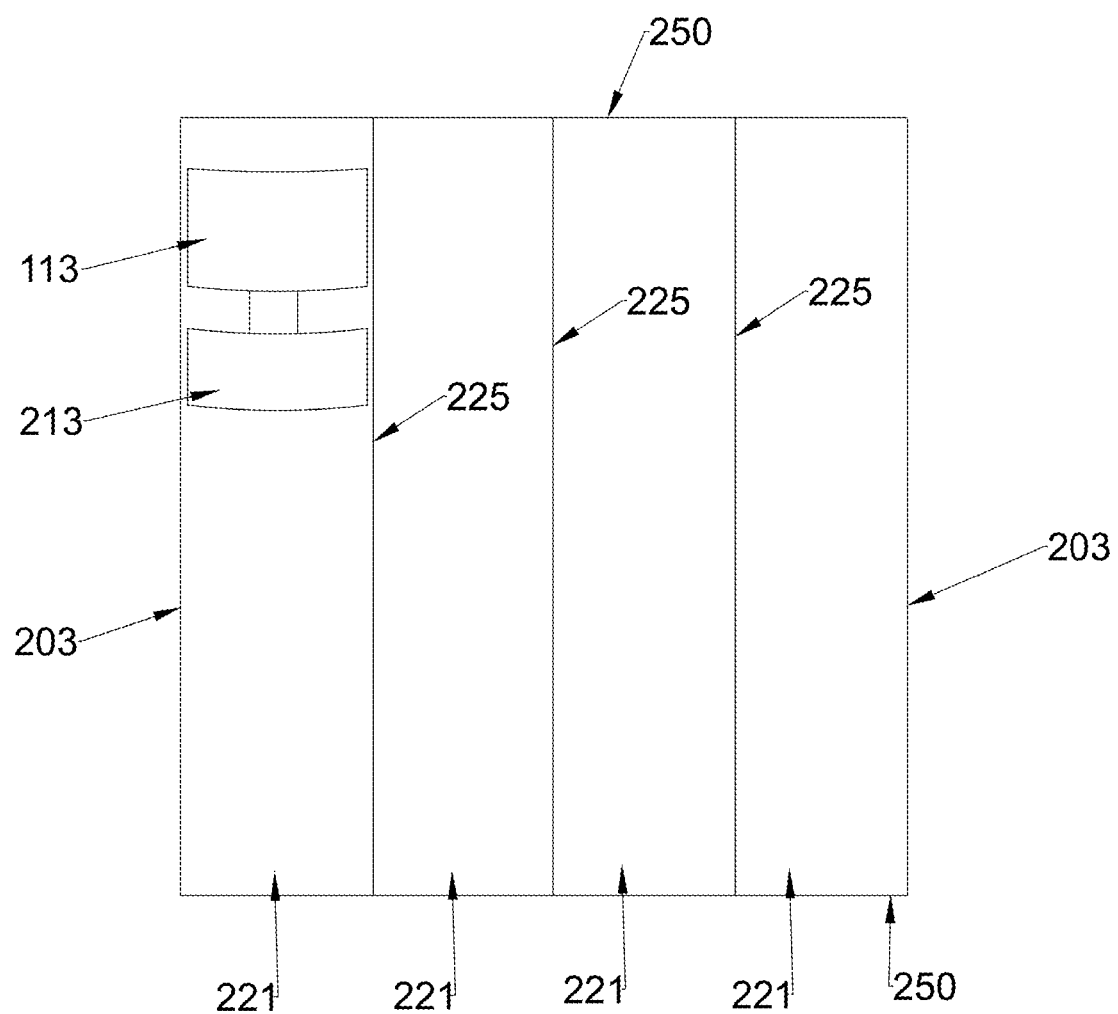
FIG. 2 illustrates a top cross-sectional view where the monolithic and/or integral air transfer apparatus or enclosure has a plurality of individual dividers within an integral cavity forming a plurality of integral segmented cavity where a pump or pumps and/or a motor or motors or other apparatus can be installed in each of the individual cavities.

As shown in FIG. 1, a door panel 145 is located on one side and/or on a bottom and/or on at least one of a plurality of segmented cavities 221 of FIG. 2 of the monolithic and/or integral air transfer apparatus or enclosure 200 in order to easily access the circulating pump 113 or pumps and/or any other apparatus.

Figure 3:
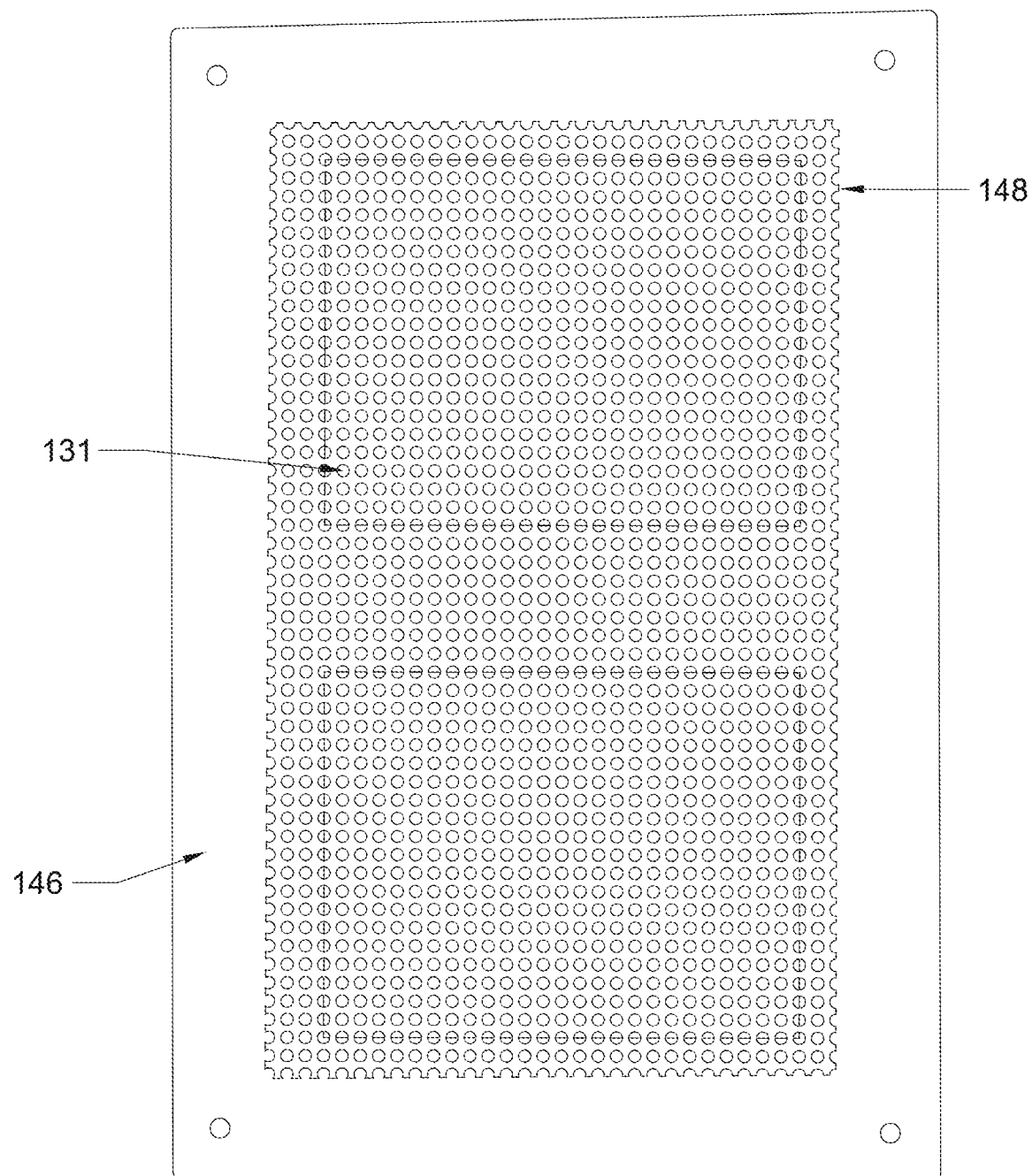
FIG. 3 is a top view of the distribution apparatus and a distribution plate within the monolithic and/or integral air transfer apparatus or enclosure.

As shown in FIG. 1, at a top portion of the indirect heat exchanger pads 101, a distribution apparatus 130 formed integrally with the monolithic and/or integral air transfer apparatus or enclosure 200 is positioned above the top portion of the indirect heat exchanger pads 101 and a fluid line/channel integrally formed within the monolithic and/or integral air transfer apparatus or enclosure 200 is fluidly connected to the distribution apparatus 130 and pressurized by the circulating pump 113. The fluid line/channel is fluidly connected to the distribution apparatus 130 from inside the monolithic and/or integral air transfer apparatus or enclosure 200, so the fluid is not in direct contact with the sun and is prevented from being heated by the direct rays or other hot elements from outside of the monolithic and/or integral air transfer apparatus or enclosure 200. As shown in FIG. 3, the distribution apparatus 130 has a plurality of holes 131 in a distribution plate 148 and the plurality of distribution holes 131 are arranged in a staggered arrangement or random arrangement so as to evenly allow the pressurized fluid to flow through the plurality of distribution holes 131 onto the outer surface of the indirect heat exchanger pads 101. The plurality of distribution holes 131 may all have the same shape and size or some distribution holes 131 have the same shape and size while other distribution holes 131 have different shapes and sizes in order to obtain a fluid level within the distribution apparatus 130 that stays at a constant level and/or maintains a level such that the outer surfaces of the indirect heat exchanger pads 101 are always fully coated or saturated during use. Further, as shown in FIG. 1, the distribution apparatus 130 has distribution apparatus inlet 132. However, the distribution apparatus 130 can have an open bottom portion 146 comprising a plurality of distribution holes 131 therein, therefore the distribution plate is not needed, and the plurality of distribution holes 131 are arranged in a staggered arrangement or random arrangement so as to evenly allow the pressurized fluid to flow through the plurality of distribution holes 131 onto the outer surface of the indirect heat exchanger pads 101.

Figure 6:
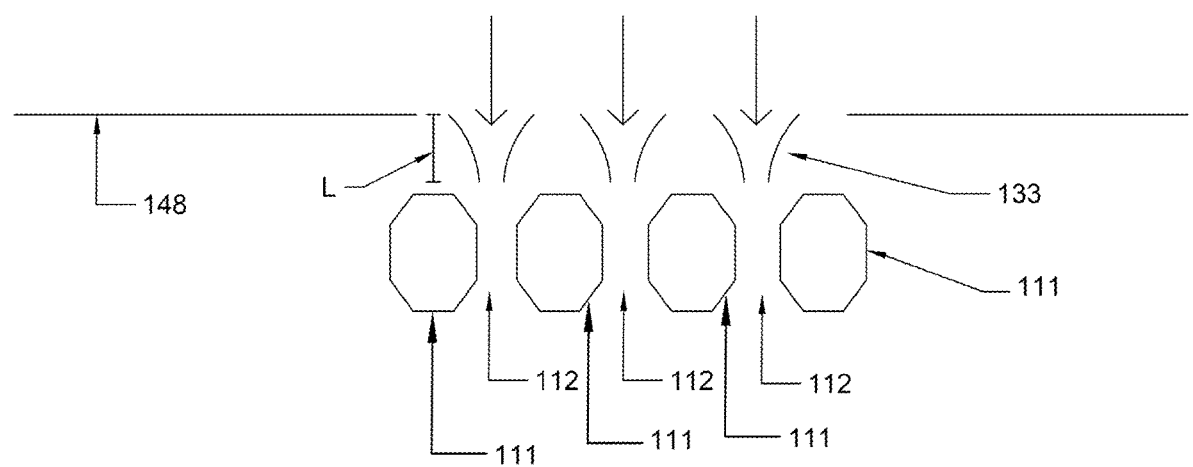
FIG. 6 is a cross sectional view of the distribution plate along with a top row of the plates/cells of the indirect heat exchanger pad.

Also, as illustrated in FIG. 6, the distribution plate 148 has nozzles 133 which have a shape so as to feed/distribute a fluid into gaps 112 between plates/cells 111 of the indirect heat exchanger pad(s) 101. The shape of the nozzles 133 can be curved, convergent nozzles, diverging-converging nozzles or other polygonal or geometric shapes. The length L of the nozzles 133 can be the same for all nozzles 133 on the distribution plate 148; the length L of the nozzles 133 can all be different on the distribution plate 148; or the length L of some nozzles 133 can be different than the length L of other nozzles 133 on the distribution plate 148 in order to always have the surfaces of the indirect heat exchanger pads 101 being fully coated or saturated during use which solves the problem of thermal warping of the heat exchanger pads 101 and increases the heat exchange efficiency of the heat exchanger pads 101 within the system. The length L of the nozzles 133 are in the range of one sixteenth of an inch to five inches. However, the length L of the nozzles 133 can be smaller than one sixteenth of an inch and can be larger than five inches.

The distribution apparatus 130 is in the same shape as the top portion of the at least one indirect heat exchanger pad 101 in order to fully coat all surfaces of the indirect heat exchanger pads 101 with a fluid. Therefore, the distribution apparatus 130 is in the general shape of a rectangle where the sides and top of the distribution apparatus 130 form a fluid tight apparatus and the bottom portion 146 of the distribution apparatus 130 allows a fluid to pass therethrough. At least one side of the distribution apparatus 130 has a fluid inlet 132 for the fluid pumped via the circulating pump(s) 113 to enter the distribution apparatus 130. Therefore, the top and all sides of the distribution apparatus 130, except for the portion of the side which has the fluid inlet 132, do not allow passage of a fluid (i.e. are closed to atmospheric air).

By having the fluid being introduced into the distribution apparatus 130 under pressure (i.e. more than atmospheric pressure) by the circulating pump 113, as opposed to having the fluid operating under atmospheric pressure solves the problem of being able to either increase or decrease the flow rate over the outer surfaces of the indirect heat exchanger pads 101. Furthermore, since the fluid is pressurized by the circulating pump(s) 113, this has allowed Applicant to create distribution hole 131 sizes within the distribution apparatus 130 such that the fluid level within the distribution apparatus 130 stays at a constant level and/or maintains a level such that the outer surfaces of the indirect heat exchanger pads 101 are always fully coated or saturated during use. The distribution holes 131 can be round, circular or any geometric or polygon shape. The size of the distribution holes 131 can have a diameter of one sixteenth of an inch to four inches. However, the distribution hole 131 diameters can be smaller and/or larger than one sixteenth of an inch or four inches. When the opening of the distribution holes 131 is not circular in shape, then the distribution holes 131 opening can be one sixteenth of an inch to four inches or can be larger or smaller than one sixteenth of an inch or four inches. The distribution holes 131 may all have the same size or may have different sizes in order to create distribution hole 131 sizes within the distribution apparatus 130 such that the fluid level within the distribution apparatus 130 stays at a constant level and/or maintains a level such that the outer surfaces of the indirect heat exchanger pads 101 are always fully coated or saturated during use.

As shown in FIG. 4, a fluid channel device 106 is located on the bottom portion of the monolithic and/or integral air transfer apparatus or enclosure 200 and is integrally formed with the bottom portion of the monolithic and/or integral air transfer apparatus or enclosure 200. The fluid channel device 106 is positioned on the bottom portion of the monolithic and/or integral air transfer apparatus or enclosure 200 such that the opening in the middle section of the bottom portion of the monolithic and/or integral air transfer apparatus or enclosure 200 is covered by the fluid channel device 106. Additionally, the fluid channel device 106 has a plurality of channels 107 spaced along the length of the fluid channel device 106. The channels 107 may have an elongated shape, a circular shape or any geometric or polygonal shape such that the collected fluid flows into the plurality of channels 107. The shape of the channels 107 is designed such that the height of the channels 107 allows the coldest lower level portion of the collected fluid to flow therethrough and is designed such that when the circulating pump 113 is operating at maximum power and flow rate, the collected fluid flows through the plurality of channels 107 at a flow rate such that the indirect heat exchanger pads 101 are being maintained fully saturated (i.e. the outside surface of the indirect heat exchanger pads 101 are not devoid of a fluid) when the monolithic and/or integral air transfer apparatus or enclosure 200 and system are operational.

The walls of the monolithic and/or integral air transfer apparatus or enclosure 200 may have different thicknesses so as to provide better heat resistance to the interior of the air transfer apparatus or enclosure 200. For example, one wall of the monolithic and/or integral air transfer apparatus or enclosure 200 may be from one sixteenth of an inch to ten inches and is thicker than all of the other walls of the monolithic and/or integral air transfer apparatus or enclosure 200.

As shown in FIG. 2, pumps 113 and motors 213 along with other apparatus such as piping, and value(s) are positioned within an integral cavity 250 or into each integral segmented cavity 221 of the monolithic and/or integral air transfer apparatus or enclosure 200 having end and side walls 203. The monolithic and/or integral air transfer apparatus or enclosure 200 is formed with at least one cavity 139 and/or an integral cavity 250 (i.e. the monolithic and/or integral air transfer apparatus or enclosure 200 and the integral cavity 250 and/or each integral segmented cavity 221 are formed and/or manufactured as one piece such that the integral cavity 250 and/or the integral segmented cavities 221 is/are formed out of the air transfer apparatus or enclosure such as a bottom or any side of the air transfer apparatus or enclosure instead of the cavity/cavities being a separate device installed/attached onto the monolithic and/or integral air transfer apparatus or enclosure 200). The integral cavity 250 can be formed on a bottom or on any side of the monolithic and/or integral air transfer apparatus or enclosure 200. The integral cavity 250 is an encapsulated space within the monolithic and/or integral air transfer apparatus or enclosure 200 such that apparatus and devices such as pumps 113, motors 213, values and piping of a heat exchanger system can be positioned within the integral cavity 250 which solves the problem of preventing leaking fluids from exiting the integral cavity 250 since there are no joints which can leak and having to take extra installation and set-up time and added labor costs of installing associated apparatus and heat exchange devices at a job site because these associated apparatus and heat exchange devices are already pre-installed prior to the installation of the monolithic and/or integral air transfer apparatus or enclosure 200 at the job site. Also, the integral cavity 250 reduces the noise heard from the pumps 113 and motors 213 because the integral cavity 250 dampens the sound heard outside of the integral cavity 250 and therefore the air transfer apparatus or enclosure 200 with the integral cavity 250 solves the problem of being able to install the air transfer apparatus or enclosure 200 in an environment which requires little or no noise.

The distribution apparatus 130 including a distribution plate comprising holes 131, and the integral cavity 250 and the at least one cavity 139, as shown in FIG. 1 (i.e. the monolithic and/or integral air transfer apparatus or enclosure 200 and the integral cavity 250, the at least one cavity 139 and/or other cavities are formed and/or manufactured from a single piece of material, i.e. one piece, such that the integral cavity 250, the at least one cavity 139 and/or other cavities, such as fluid flow cavities, the distribution apparatus 130 including a distribution plate comprising holes 131, the integral cavity 250 and the at least one cavity 139 are formed out of the monolithic and/or integral air transfer apparatus or enclosure 200 instead of the monolithic and/or integral air transfer apparatus or enclosure 200 being formed from a plurality of parts). The integral or the monolithic air transfer apparatus or enclosure 200 is preferably made of HDPE and formed by the manufacturing process of molding, injection molding, gas assisted injection molding, liquid/water assisted injection molding, blow molding, extruding, electrofusion, 3-D printing or any other equivalent method. Preferably, the monolithic and/or integral air transfer apparatus or enclosure is manufactured by the manufacturing process of injection molding, gas assisted injection molding or liquid/water assisted injection molding. However, if needed, some non-integral/monolithic pipe(s) may be installed or attached to the air transfer apparatus or enclosure 200.

The HDPE, which the air transfer apparatus or enclosure 200 is made from, may include Ultraviolet (UV) protection absorbers and/or additives or compounds such as benzotriazoles, benzophenones and organic nickel compounds and any equivalent absorber, additives or compounds; and/or fire suppression/retardant/protection additives or compounds such as brominates, organophosphorus compounds, melamine based compound and metal hydroxide and any equivalent fire suppression/retardant/protection additives or compounds; and/or any antifungal and/or antibacterial and/or antimicrobial additives or compounds such as isothiazolinone compounds, zinc pyrithione, thiabendazole, and silver antimicrobial compounds and any equivalent antifungal and/or antibacterial and/or antimicrobial additives or compounds in order to protect which the air transfer apparatus or enclosure 200 from the harmful effects of UV, fire and fungal, bacterial and microbial problems which also increases the useable life of which the air transfer apparatus or enclosure 200. Moreover, all side, top and bottom walls of the monolithic and/or integral air transfer apparatus or enclosure 200 are made from a composition of HDPE and/or a flame-retardant additive that meets the requirement Class A: Flame Spread 0-25; smoke-developed 0-450 under the National Fire Protection Agency (NFPA) 101@ Life Safety Code® which is classified based on the standard test method for assessing the surface burning characteristics of building materials/products (i.e. ASTM E 84).

Also, as shown in FIG. 2, the integral cavity 250 includes a plurality of individual dividers 225 forming a plurality of integral segmented cavities 221 is integrally or monolithically formed (i.e. formed and/or manufactured as one piece with the air transfer apparatus or enclosure 200 such as at a bottom or any side of the air transfer apparatus or enclosure 200) with the monolithically and/or integral formed air transfer apparatus or enclosure 200 where a pump(s) 113 and motor(s) 213 or other apparatus can be installed in one or each of the individual integral segmented cavities 221. The plurality of individual dividers 225 are formed in an integral cavity 250 forming the plurality of segmented cavities 221.

Since the plurality of individual dividers 225 are integrally or monolithically formed with the air transfer apparatus or enclosure 200 and/or in the transfer apparatus or enclosure 200, the plurality of individual dividers 225 and integral segmented cavities 221 are one monolithic structure and is made from a monolithic block of HDPE. The pump(s) 113 and motor(s) 213 are incorporated into one or each of the individual integral segmented cavities 221 so the pump(s) 113 and motor(s) 213 are embedded into the HDPE individual integral segmented cavities 221 where the pump impeller moves freely within each of the individual integral segmented cavities 221 and the motor armature and motor wiring are embedded within individual integral segmented cavities 221 or any integrally formed cavity of the air transfer apparatus or enclosure 200. Each of the integral segmented cavities 221 is encapsulated to prevent any liquid from exiting each of the integral segmented cavities 221. Since the pump 113 is a seal less magnetically driven pump 113, the pump 113 does not have any bearings to wear out or seals to leak fluid. Moreover, the impeller of the pump 113 is floating/suspended and contactless inside a sealed casing and is driven by the motors' 213 magnetic field. As the shaft of the motor 213 does not extend into the interior of the pump 113, there is no seal for the shaft and because the impeller is not fixed to the motor shaft, the impeller floats inside the pump housing. Additionally, the impeller spins, at the same speed as the motor, supported by a stationary shaft. The only moving part which touches the liquid is the impeller. Therefore, this allows the seal less magnetically driven pump 113 to be installed/encapsulated inside an integral cavity 250 and/or inside each of the individual integral segmented cavities 221 or at least one of the integral segmented cavities 221 because the seal less magnetically driven pump 113 does not have seals or bearings and therefore will operate without leaking fluid and without needing maintenance due to worn our bearings and faulty seals. If it is desired, the encapsulated integral cavity 250 and/or each of the encapsulated individual integral segmented cavities 221 may have a door or access into the encapsulated integral cavity 250 and/or each of the encapsulated individual integral segmented cavities 221 to be able to replace or exchange the pump 113. For example, the encapsulated integral cavity 250 and/or each of the encapsulated individual integral segmented cavities 221 may have a door with appendages where the appendages insert into grooves or O-ring in the encapsulated integral cavity 250 and/or each of the encapsulated individual integral segmented cavities 221 so that one can push and/or turn the door to open and close the door in order to access the pump(s) 113. The encapsulated integral cavity 250 and/or each of the encapsulated individual integral segmented cavities 221 can be made to have a size and/or diameter which is similar to the same size and/or diameter of the pump 113. The term "similar" above means there is a small tolerance between the inner surface of the encapsulated integral cavity 250 and the encapsulated individual integral segmented cavities 221 and the outer surface of the pump 113 in the range of one sixty-fourth of an inch to one half of an inch but the tolerance can be less than one sixty-fourth of an inch and larger than one half of an inch.

Figure 5:
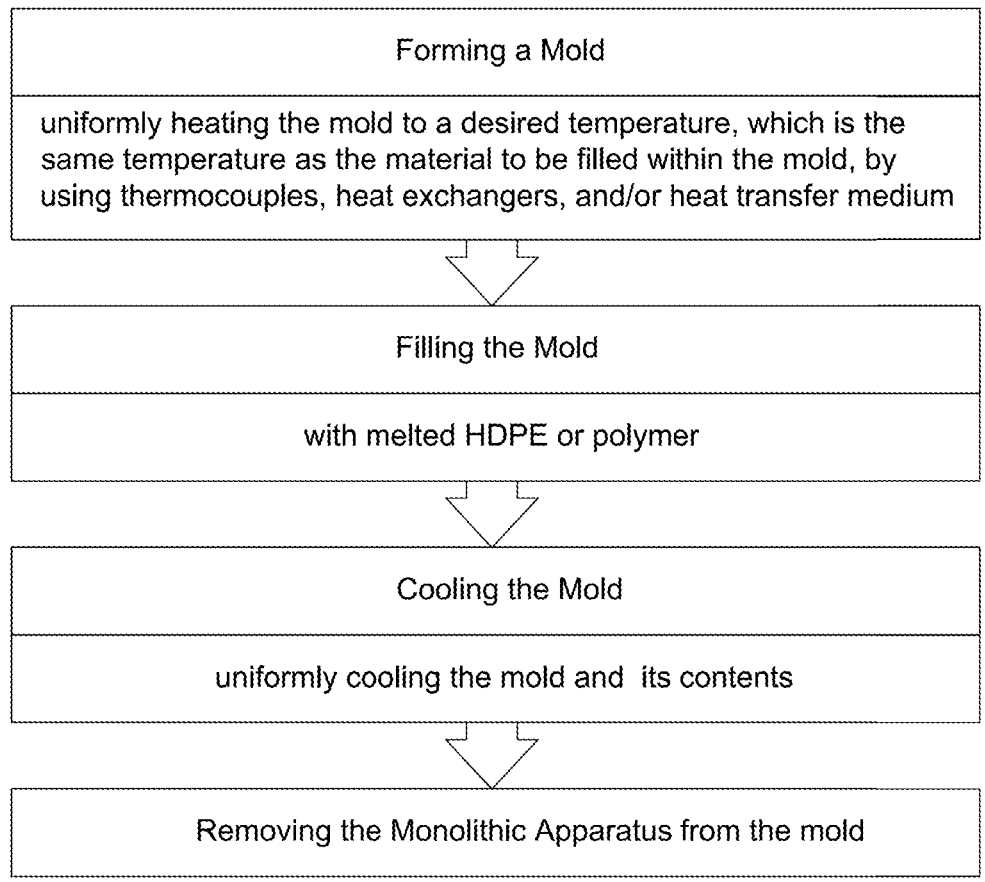
FIG. 5 is flowchart of the method of manufacturing the monolithic and/or integral air transfer apparatus or enclosure.

As shown in FIG. 5, the monolithic and/or integral air transfer apparatus or enclosure 200 is formed by the manufacturing process of molding, injection molding, gas assisted injection molding, liquid/water assisted injection molding, blow molding, extruding, electrofusion, 3-D printing or any other equivalent method and preferably injection molding, gas assisted injection molding or liquid/water assisted injection molding where the HDPE is melted and then injected into a mould which has the shape and design of the monolithic and/or air transfer apparatus or enclosure 200. Prior to the melted HDPE being placed into the mould, the mould is uniformly heated to a temperature which is the same temperature as the melted HDPE so that when the HDPE enters into the mould, the mould and the HDPE have the same temperature which reduces thermal stresses of the HDPE and the final molded product (i.e. the monolithic and/or integral air transfer apparatus or enclosure 200). During the entire time the HDPE is inserted into the mould, the mould is kept at a constant temperature, which is the same temperature as the entering HDPE by at least one of and/or a combination of thermal couples; piezo-electric heaters, heat exchangers; and heating medium such as fluids (e.g. water), hot gases and solids placed inside and/or outside the mould. Once the HDPE fully fills the mould, after an amount of time has elapsed, the entire mould is uniformly cooled with by at least one of and/or a combination of piezo-electric coolers, heat exchangers; and cooling medium such as fluids (e.g. water), cold gases and solids placed inside and/or outside the mould. Once the molded product (i.e. the monolithic air transfer apparatus or enclosure 200) is cooled to a desired temperature, the product is removed from the mould.

Figure 7:
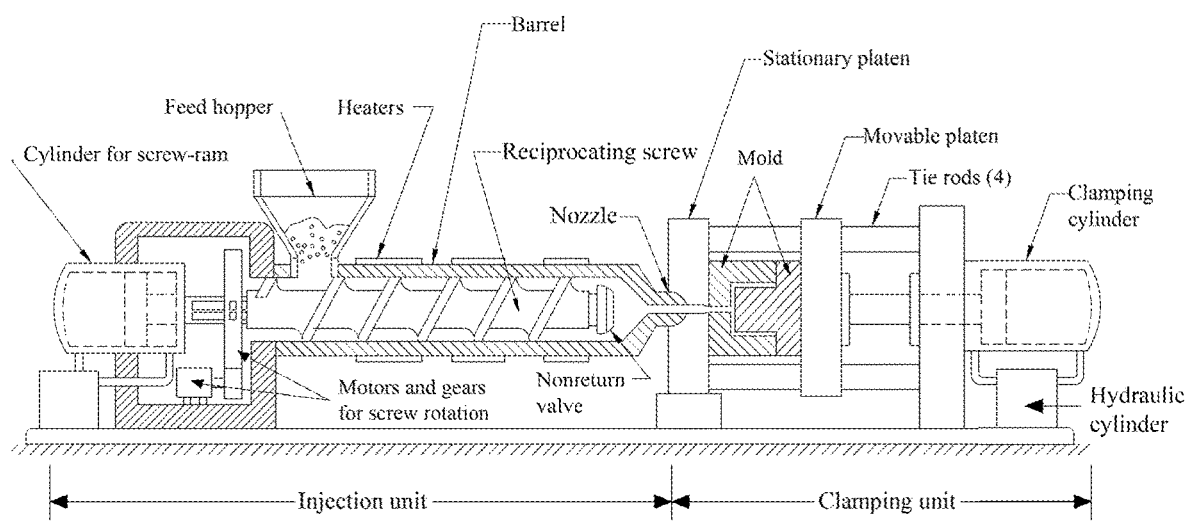
FIG. 7 illustrates an injection molding machine.

FIG. 7 illustrates an injection molding machine comprised of an injection unit and a clamping unit.

Injection molding is the process of heating material such as raw material granules (resin) to the point of melting, where the material is pressed into a mould and cooled into its final shape. In injection molding, raw material granules (resin) are placed in a hopper and plunged through a heated channel to be melted to liquid prior to reaching a mould and subsequently cooled to become a solid final piece.

For example, to create an injection-molded product, the following steps are performed:

A mould is placed in an injection molding machine.

Pellets are heated until they are liquid.

The liquid plastic may pass through a dryer, if necessary, in order to remove moisture from heating the pellets, where the moisture may harm the finished product due to splay or hydrolysis.

The liquid formed from the liquified pellets is conveyed into the injection molding machine through a vacuum, an arguer or other equivalent apparatus or method.

The liquid formed from the liquified pellets goes through a heated injection barrel, which is attached to a feeder/feed throat.

The liquid formed from the liquified pellets is injected under pressure through the feed throat into the mould.

The mould, which is cooler than the liquid formed from the liquified pellets since the mould is cooled via a cooling system and/or apparatus, causes the material of the liquid to cool to a solid state, which forms the part. However, the mould can be heated to the same temperature as the liquid formed from the liquified pellets when the liquid formed from the liquified pellets first enters the mould and one the mould is filled with the liquid, then the mould is cooled via a cooling system and/or apparatus to cause the material of the liquid to cool to a solid state.

The mould opens and the cooled part is ejected from the mould either by hand (in a vertical injection molding machine) or by force of gravity (in a horizontal injection molding machine).

Gas can be used in combination with injection molding and is called gas assisted injection molding. Similarly, a liquid can be used in combination with injection molding and is called liquid assisted injection molding. If the liquid is water, then the injection molding is called water assisted injection molding.

Figure 8:
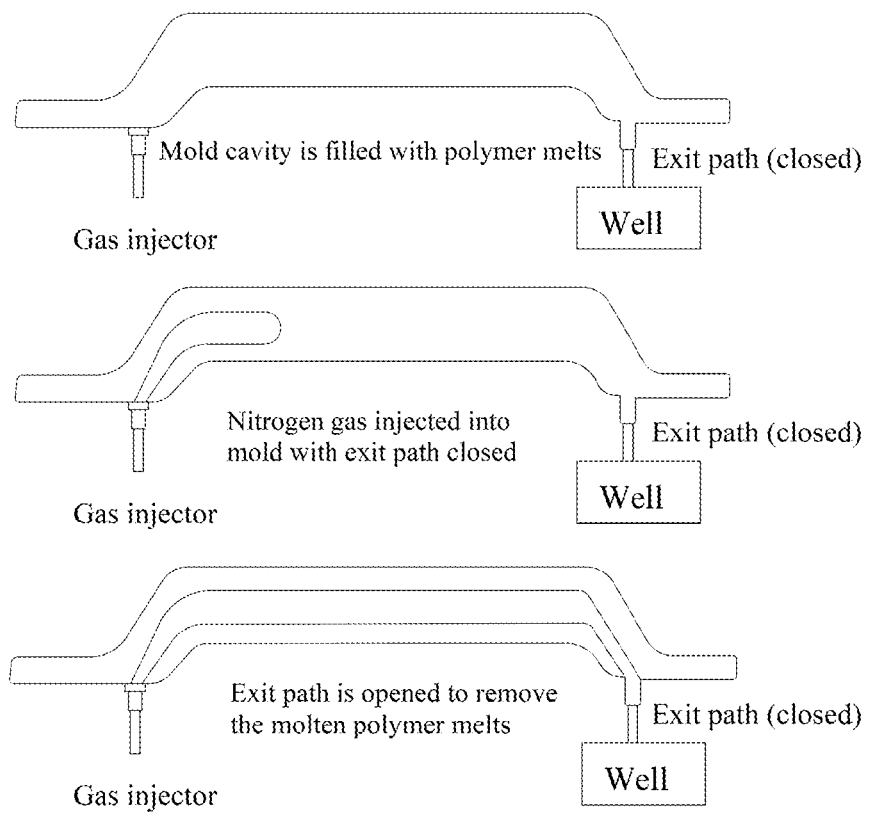
FIG. 8 illustrates a gas assisted injection molding process.

FIG. 8 illustrates a gas assisted injection molding process.

Gas assisted injection molding is shooting gas (i.e. for example at a pressure range of 300 psi to 2500 psi, but the pressure could be lower than 300 psi or higher than 2500 psi) into the material-filled injection mould which makes hollow sections in the part being made.

Internal gas assist injection molding is a low pressure, injection molding process that injects pressurized gas, such as nitrogen, into an interior of a short shot of melted material. Short shots are molded parts that are not completely filled out. The gas flows through strategically designed and placed gas channels, following the path of least resistance to displace the material in the thick areas of the part by forming hollow sections. The pressurized gas packs and holds the molten material against cavity walls until the part solidifies. The gas pressure is kept constant in order to keep the part from shrinking when the part begins to cool and prior to being ejected from the mould. Once the part solidifies, the gas is vented out a port of the mould.

In an external gas assisted injection molding application, the gas is used on the outside surface, but still within the mould cavity, to consolidate the component.

As shown in FIG. 8, gas assisted injection molding injects a pressurized gas such as nitrogen or other gas into the interior of the polymer melt within the mould. The gas follows the path of least resistance, penetrating the part via carefully designed networks of thicker cross-sectioned gas channels. The nitrogen or the other used gas seeks the area in the mould cavity with the lowest pressure and travels most efficiently in the hotter core regions of the polymer melt. It has a viscosity much lower than its polymer or HDPE host and remains isolated within the channel as it flows in the direction of the melt front. The displaced molten polymer is pushed towards the melt front by the advancing gas, filling and later packing the mould cavity. There is almost constant pressure in all areas penetrated by the gas. The pressure pushes the polymer or HPE against the mould walls and helps keep the polymer from shrinking as the part begins to cool before ejection from the mould. One method of gas assisted injection molding injects the polymer and gas through the same injection nozzle. The polymer only partially fills the cavity in what's called a short-shot. Then gas injection pushes material from the core regions to fill out the cavity. A second method which may be used to make the monolithic air transfer apparatus or enclosure is full-shot molding and fills the cavity completely with a polymer or HDPE. Gas then enters via gas pins at various locations in the mould. This packs the melt into difficult-to-fill areas and helps compensate for shrinkage as the polymer cools. The gas can be injected sequentially and at various pressures which are typically rather low. However, in the gas assisted injection molding, there is no need hardware such as gas injectors, nozzles, or pins when injecting nitrogen directly into the cavity. But gas-injection pressures must be high enough to make the gas break through the residual polymer left inside the nozzle.

An alternative method is multi-nozzle gas-assist. This multi-nozzle gas-assist allows to strategically position injection sites of both the polymer or HDPE and gas to obtain and get an optimum mould fill. Independent control of injection points and gas pressure can be used. In order to balance the mould when parts comprise with multiple or branched gas channels, use a conventional rib configuration and place the channels at the base of the ribs for guiding the gas to the mould extremities. Mould-fill analysis programs designed specifically for the gas-assist process can help determine gate, channel, and gas injection locations for balancing mould fill. Also, software such as mould-fill analysis, can be used to exactly balance the melt flow into the cavities/channels of multicavity tools. The multiple or branched gas channels of the manufactured part can be arranged symmetrically and/or asymmetrically in the mould and each should have its own separate gas needle.

Figure 9:
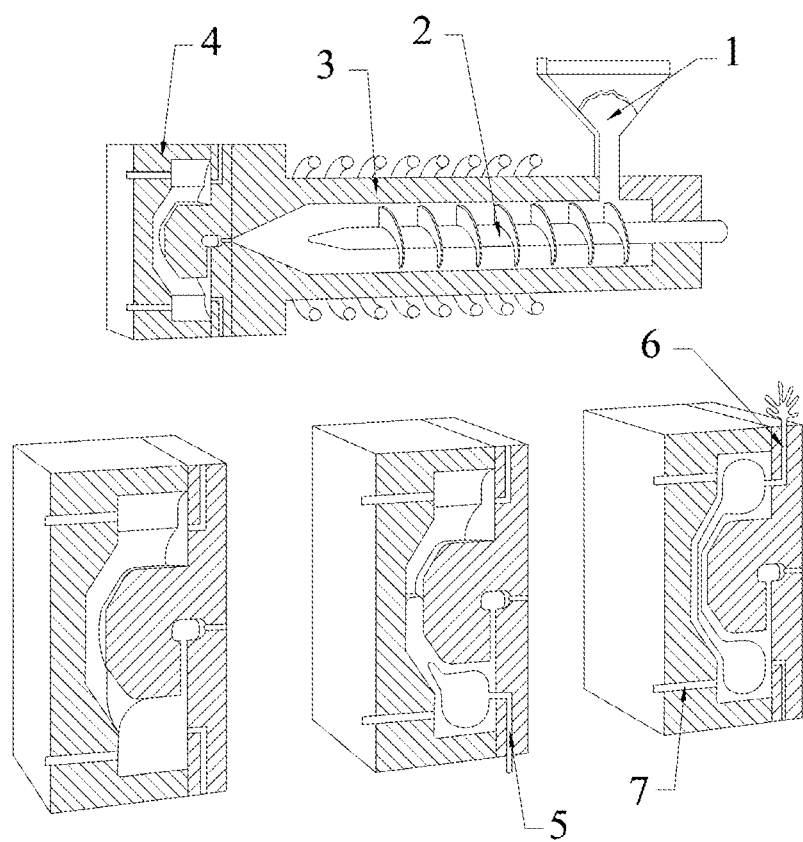
FIG. 9 illustrates a water assisted injection molding process.
Figure 10:
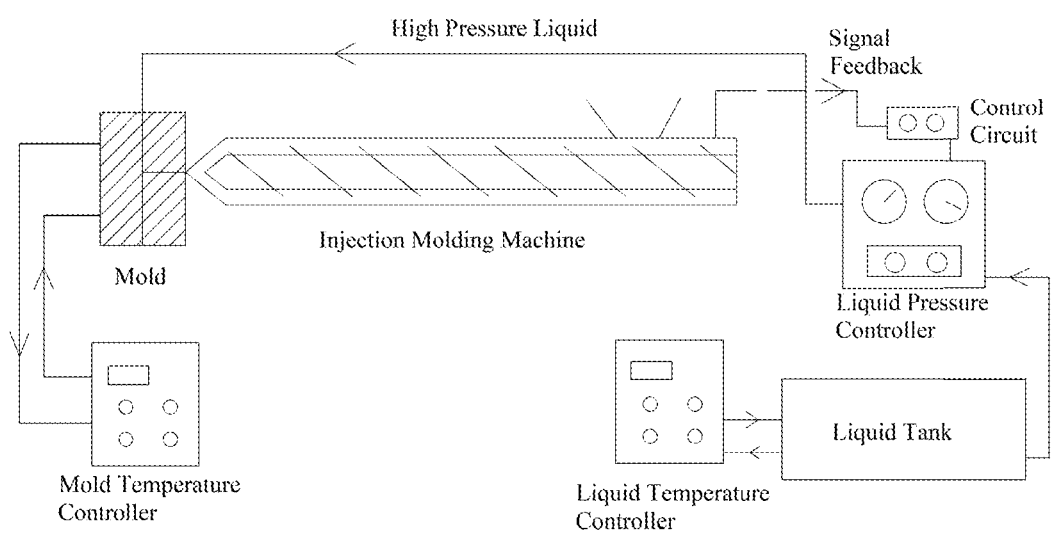
FIG. 10 illustrates a liquid assisted injection molding process.

FIG. 9 and FIG. 10 illustrates a water or liquid assisted injection molding process. Water assisted injection molding is similar to gas assisted molding as a means to core out thick sections but can provide for a more uniform inner wall. Water assisted injection molding is an injection molding process where a molten material along with water is injected into a mould to create a part such as a sold and solid and hollow part/component. On example of water assisted injection molding is disclosed below per FIG. 9.

As shown in FIG. 9, pellets (1) are supplied via a hopper into a rotating screw or helical screw (2) whose spiral shape moves the pellet forward through a heated chamber (3). The pellets are heated gradually and turn into a homogeneous melt as the melt approaches an end of the screw. The melt is pressed in a mould (4) as the entire screw is pushed forward by an applied pressing force and after the mould is partially filled, water (5) is injected which pushes the melt and fills the mold while a hollow is created in the part. The water is flushed through the part and discharged through an outlet (6) on the other end of the piece. After the melt is solidified via cooling, the part is removed from the mould using an ejector (7).

Also, nozzles can inject water or gas and can also act as an outlet for water ejection from the part. The nozzles can be mounted flush with the mould to introduce water by breaking through the part surface, or they can protrude into the mould cavity and core directly from within the part. The water assisted injection molding operates in a range up to 4350 psi. Water assisted injection molding can be applied in one of four processes.

Short shot: Also called the bubble or blow-up process, it is executed by partial filling of the mould cavity with melt. Water is injected into the mould before the end of the melt injection, pushing the material to the end of the cavity for final packing. Valves close off the melt from the injection unit and water from the pin. A release valve for the water opens allowing water to drain from the part. A valve mounted at or near the end of fill can facilitate water evacuation using compressed air. The entry and exit points for water or air can be at or near the same point. The water injection pressure is higher than the melt pressure to push the melt to end of fill.

Pushback: The melt completely fills the cavity. Opening a water pin located near the end of the melt fill pushes the excess melt back into the head space in the injection unit. A nozzle and check ring accommodate material coming back into the injection unit.

Overflow: The mould cavity is completely filled with the melt and closed off by a valve. A separate pin then opens in the mould for water injection, while simultaneously, a valve at the end of the cavity fill opens a path from the main cavity into a secondary or overflow cavity. The incoming water displaces the melt, which is pushed into the secondary cavity. The secondary valve is closed for hold and pack. Water can be expelled through gravity or evaporation.

Flow process: A combination of the short-shot and overflow methods flushes water through the part for enhanced cooling. The mould cavity is partially filled, then water is introduced, pushing the material to the end of the fill. A valve opens at the end of the fill, and the water breaks through the melt and streams through the valve into a water-recirculation circuit.

As shown in FIG. 10, the mould can be in fluid communication with a mould temperature controller which comprises thermostats, sensors, other equivalent temperature adjustment apparatus and a heating and/or cooling system which is used to control the temperature of the mould. For example, the mould can be heated with the mould temperature controller to the same temperature of the injected material, for example melted HDPE pellets, into the mould. Then after a desired amount of time, the mould temperature controller cools the mould to obtain a solid HDPE part. Also, the liquid, such as water, is injected into the mould at a desired pressure via a liquid pressure controller and control circuit. Also, the liquid can be stored in a tank and heat and/or cooled using a liquid temperature controller.

Both using gas and water in the process of injection molding for the method of manufacturing the air transfer apparatus or enclosure 200. For example, gas be used initially to form the hollow sections, then water to cool the material such as HDPE, and finally gas to exhaust the water.

Figure 11:
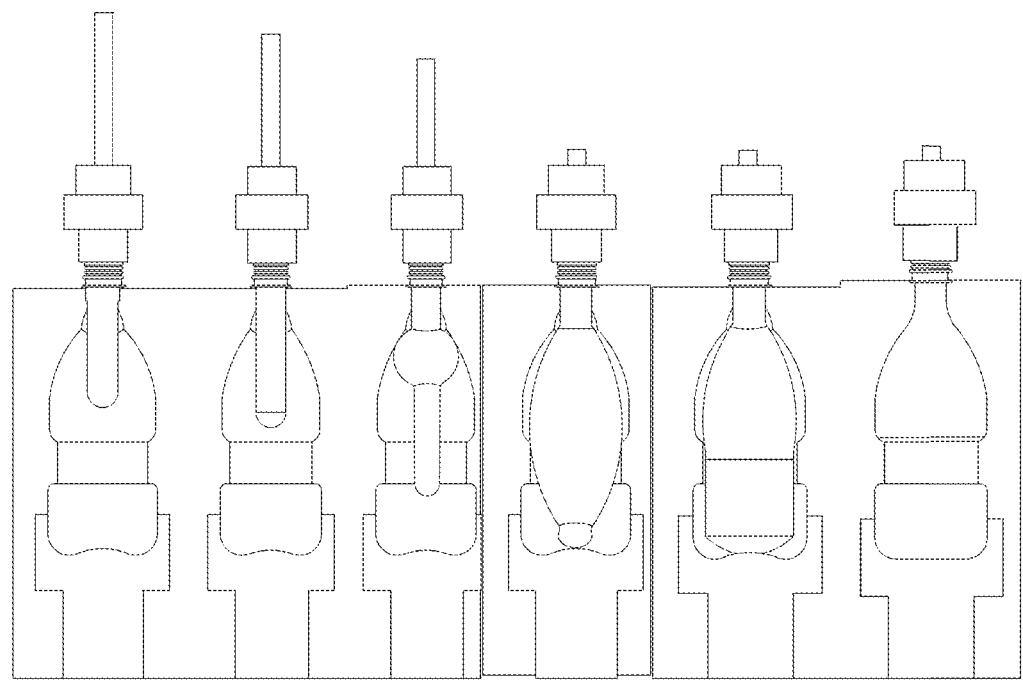
FIG. 11 illustrates an injection blow molding process.
Figure 12:
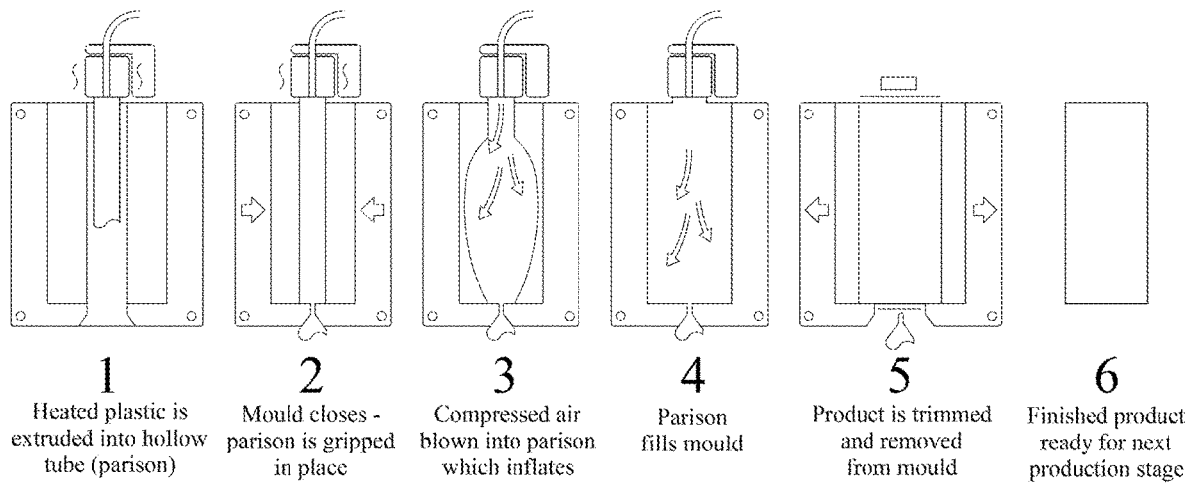
FIG. 12 illustrates an extrusion blow molding process.

FIG. 11 illustrates an injection blow molding process and FIG. 12 illustrates an extrusion blow molding process.

Blow molding is a specialized type of plastic processing used to create parts which includes hollow sections in the part.

For example, to create a blow-molded product, the following steps are performed.

As shown in FIG. 11 and FIG. 12, the mould is placed in a blow molding machine.

A parison (also known as a preform), which is a tube of plastic with one hole that allows air to funnel through, is heated until it becomes soft. The molten parison is placed into a blow mould that is cooler in temperature. An air tube is inserted into a hole in the parison. As shown in FIG. 12, the mould closes around the parison in order to shape the part while at a blow station and the air inside the parison blows the molten material until the material forms to the shape of the mould. Once the part has cooled, the mould opens and the completed part is ejected from the mould. At the blow station, air or other gas or mixture of gases is blown into the parison inflating the parison into the shape of the mould. Once the material has cooled via a cooling system and/or apparatus, the mould is opened, and the part is extruded.

Figure 13:
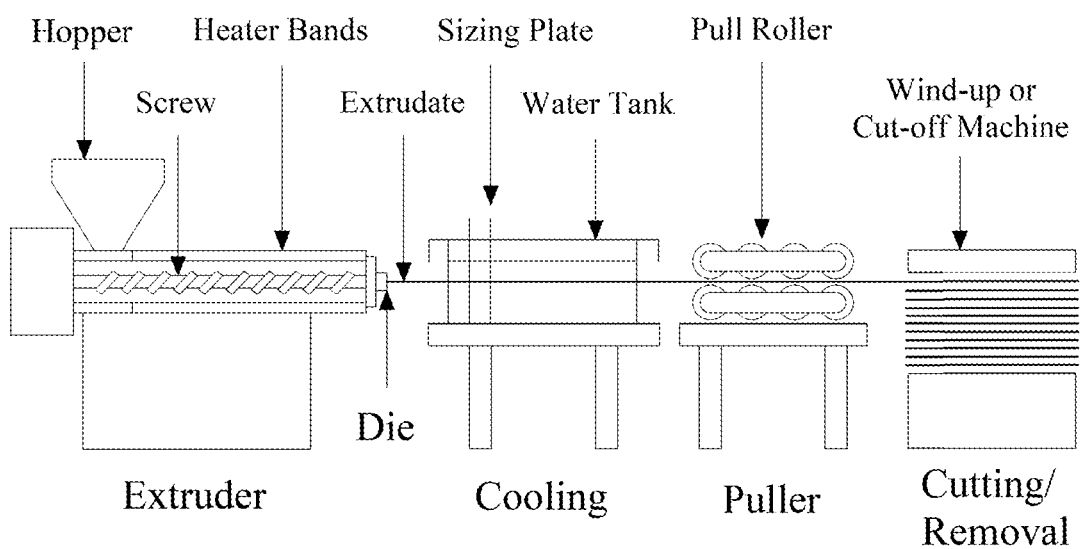
FIG. 13 illustrates an extrusion machine and process.

FIG. 13 illustrates an extrusion machine and process. Similar to injection molding, the extrusion machine and process, as shown in FIG. 13, comprise a hopper; a screw or arguer; a heater or heater bands in thermal communication with the unit/extruder; a die; a cooling section comprised of a water tank and sizing plates; a pull roller; and a wind-up or cut-off machine. Plastic or HDPE extrusion manufacturing is a process in which a thermoplastic raw material, usually in the form of pellets, is melted and formed, under pressure, into a continuous shape or profile. The process is also very simple and divided into few stages. At first, a plastic extruder is heated to melt the solid polymer or HDPE so that it can be pumped and filled into a die where it takes its final and desired shape. The plasticized polymer then sets and retains the shape after being cooled. The extruder is also used to mix various ingredients like colors, fibers, mineral fillers, additives, and processing aids with the molten polymer. Also, the extruder performs disperses and distributes all constituents of the mixture evenly and adequately to provide with consistent mixture, pressure and temperature.

In general, an extrusion system and process are as follows. An automatic feeding and dosing mechanisms for inserting a preferred amount of polymer or HDPE and other components. An extruder which melts and mixes the ingredients with molten polymer or HDPE. An effective filtration system to remove any contaminations. A connector or adapter which connects the extruder to the die. A die which transforms molten polymer into a desired shape. A cooling mechanism and/or apparatus which cools down and sets the polymer to gain its final shape. A puller which takes out the polymer from the die after the process is complete.

Figure 14:
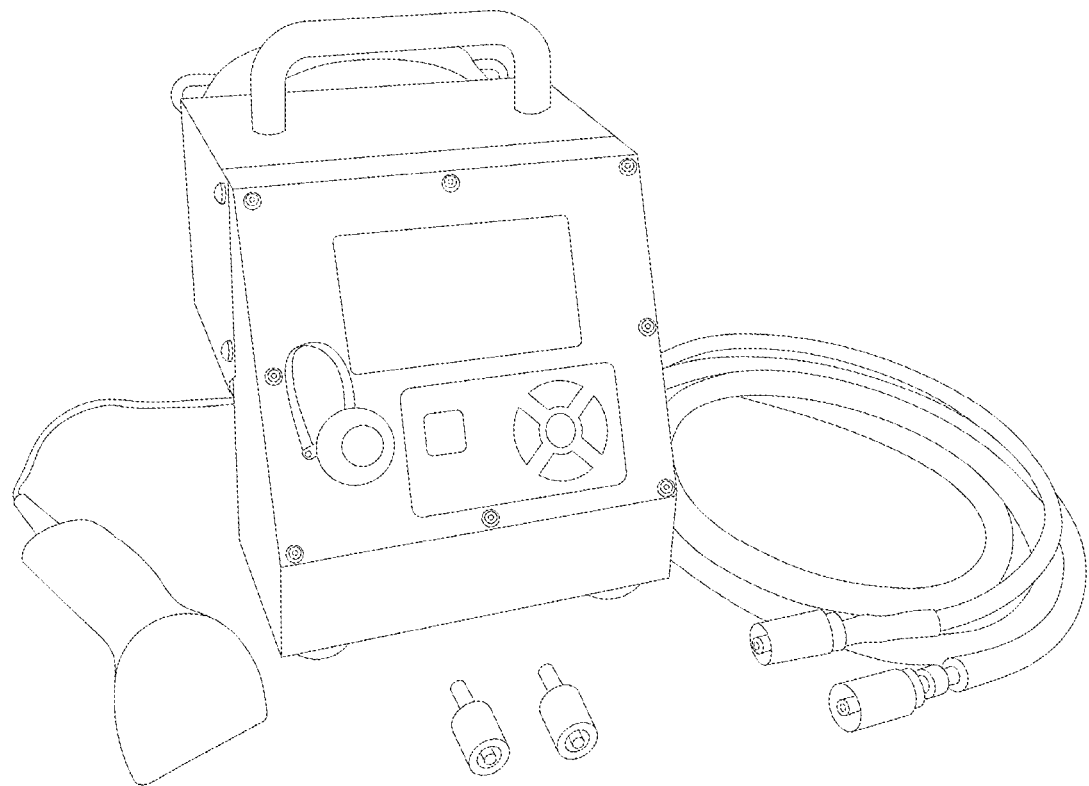
FIG. 14 illustrates an electrofusion machine.

FIG. 14 illustrates an electrofusion machine which is used to weld together at least one side, one top or one bottom of the monolithic air transfer apparatus or enclosure with at least one HDPE plate or panel to form the final product of an integral air transfer apparatus or enclosure 200. The entire air transfer apparatus or enclosure 200 is made from HDPE.

Electrofusion is a method of joining two separate parts/components using a wire which is used to weld a joint together.

The electrofusion process of manufacturing the integral air transfer apparatus or enclosure 200 is as follows. All but one side or top or bottom of the monolithic air transfer apparatus or enclosure is formed by any one of the disclosed methods of molding, injection molding, gas assisted injection molding, liquid/water assisted injection molding, blow molding, extruding, electrofusion, 3-D printing and this forms the monolithic (i.e. a one piece HDPE structure which does not have any formed joints which need to be sealed or connected together) transfer apparatus or enclosure. Therefore, there is at least one side, and/or at least one top and/or one bottom which is void of an air transfer apparatus panel or plate and therefore, the air transfer apparatus or enclosure has an opening (i.e. the air transfer apparatus or enclosure is not closed on all sides) at this voided at least one side, and/or at least one top and/or one bottom. Either of gas assisted injection molding or liquid/water assisted injection molding is the preferred method of manufacturing the monolithic air transfer apparatus or enclosure.

Figure 17:
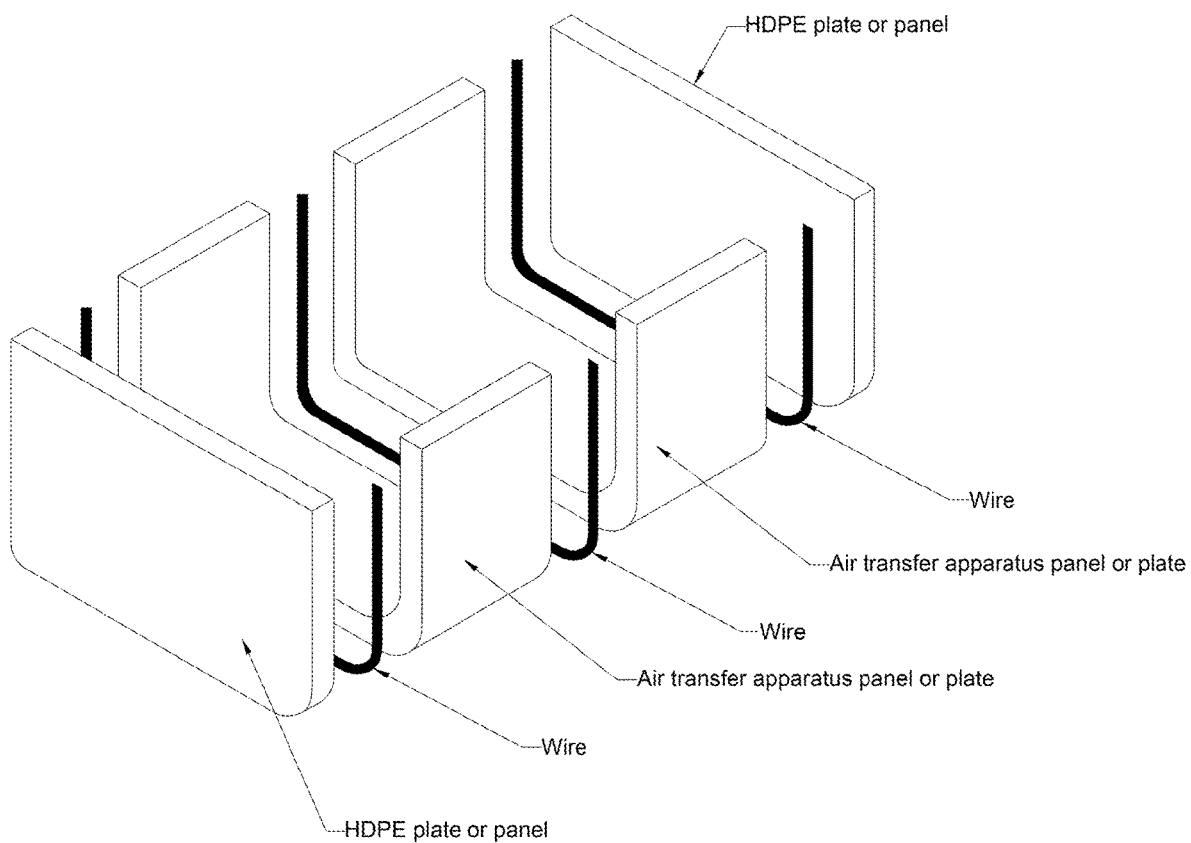
FIG. 17 illustrates electro fusing a wire to surfaces of the invention.

The side or top or bottom of the monolithic air transfer apparatus or enclosure which does not comprise/contain a plate or panel (i.e. the missing side or top or bottom of the manufactured HDPE monolithic air transfer apparatus or enclosure) is electrofusion welded, using a wire which is heated with the electrofusion machine, as shown in FIG. 14 and FIG. 17, with a HDPE plate or panel, which was manufactured by any one of the disclosed methods of molding, injection molding, gas assisted injection molding, liquid/water assisted injection molding, blow molding, extruding, electrofusion, 3-D printing, such that the electrofusion method of joining the HDPE plate or panel with the surfaces of the missing side or top or bottom of the monolithic air transfer apparatus or enclosure forms a seamless weld and an integral air transfer apparatus or enclosure. The HDPE plate or panel is made from the same material and has the same thickness as the material and thickness of the monolithic air transfer apparatus or enclosure. During the electrofusion welding, the HDPE plate or panel and monolithic air transfer apparatus or enclosure is restrained with a restraining device such as a strap(s) and/or a frame support. The electrofusion is formed by welding edge surfaces of the HDPE plate or panel to edge surfaces of the at least one side, or the at least one top or the bottom which is void of an air transfer apparatus panel or plate. Thus, once the HDPE plate or panel is connected/electrofusion welded to one of the at least one side, or the at least one top or the bottom which is void of an air transfer apparatus panel or plate, then the integral air transfer apparatus is formed.

The wire is placed on or in the HDPE plate or panel or the surfaces of the missing side or top or bottom of the monolithic air transfer apparatus or enclosure or on both the HDPE plate or panel and the surfaces of the missing side or top or bottom of the monolithic air transfer apparatus or enclosure in order to electrofusion weld the HDPE plate or panel and the surfaces of the missing side or top or bottom of the monolithic air transfer apparatus or enclosure together forming the integral air transfer apparatus or enclosure. The surfaces which the wire is placed (i.e. surfaces of the HDPE plate or panel and/or the surfaces of the missing side or top or bottom of the monolithic air transfer apparatus or enclosure) are grooves which are made within the HDPE plate or panel and/or the missing side or top or bottom an air transfer apparatus panel or plate of the monolithic air transfer apparatus or enclosure. Therefore, the wire is embedded with grooves in the HDPE plate or panel and/or the missing side or top or bottom of the air transfer apparatus panel or plate of the monolithic air transfer apparatus or enclosure. The grooves may be linear or have undulations or may be in the form of a sine or cosine wave.

The electrofusion machine, as shown in FIG. 14, has built-in electric heating elements which are used to heat the wire by connecting the built-in electric heating elements to the ends of the wire and forming a seamless weld between the surfaces of the HDPE plate or panel and the missing side or top or bottom of the air transfer apparatus panel or plate of the monolithic air transfer apparatus or enclosure. The wire may have a pin attached to each end thereof and each of the built-in electric heating elements may have a socket/plug which connects to the pins of the wire. Alternatively, each of the built-in electric heating elements may have a pin attached thereto and each end of the wire may have a socket/plug which connects to the pins of each of the built-in electric heating elements.

The wire (i.e. electrofusion wire) is a resistance heating wire. The electric heating elements of the electrofusion machine generates an electrical current which is passed through the wire and heats the wire up to a design temperature (i.e. a temperature which melts the HDPE which is at least 130.8 degrees C. and up to 180 degree C.) this heat is applied for a set period of time heating the HDPE to melt locally around the wire. That is the heating of the wire is to a temperature which melts the HDPE around the wire of the HDPE plate or panel and the HDPE air transfer apparatus.

The time and temperature are pre-defined to ensure that there is a sufficient melt zone between the surfaces which fuses together when cooled, providing a strong and leak-free welded joint. Prior to joining the surfaces/parts together, the surfaces or faces of the parts which are welded together are cleaned to remove dirt and/or debris between them.

The wire is made from alloys such as copper, iron, aluminum, as nickel, nickel chromes and steels. Also, the wire can comprise a coating on the outer surface of the wire. The wire coating may comprise a dual coating of modified polyester enamel which combines excellent physical, technical and electrical properties of a polyester base coat with the chemical resistance, surface toughness, smoothness and high thermal rating of a polyamide-imide polymer topcoat. The combination of these two high quality resins produces a coating that has outstanding abrasion resistance, flexibility, chemical resistance, burnout and thermal shock resistance and dielectric strength.

Figure 15:
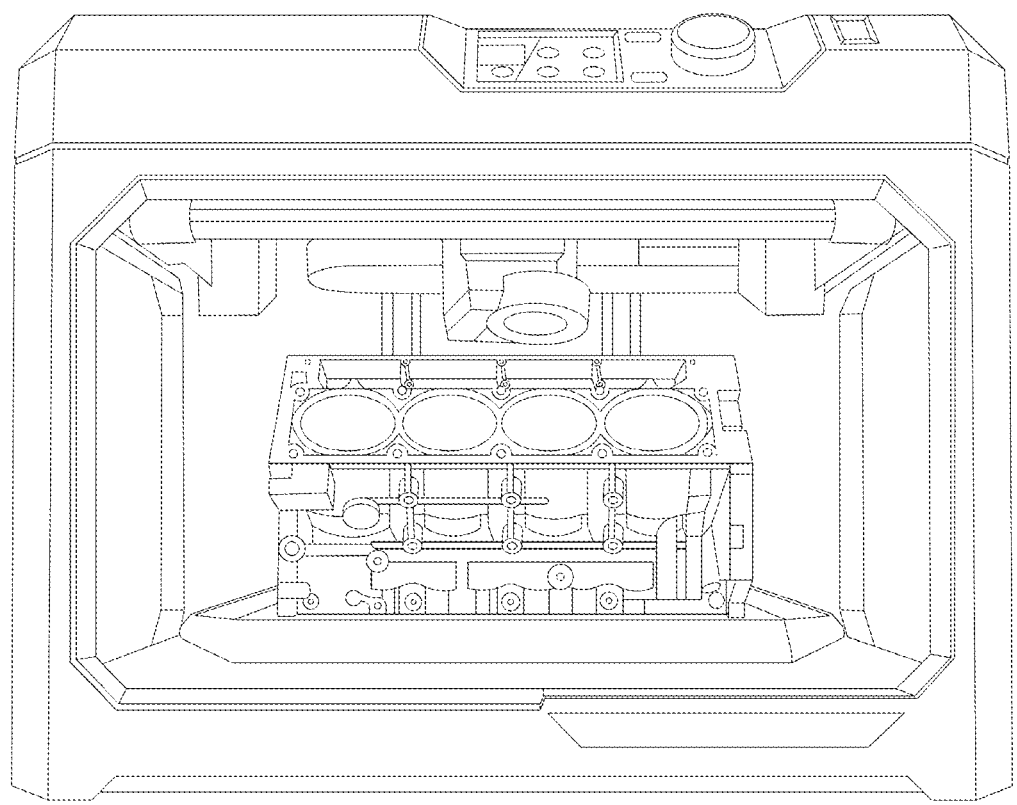
FIG. 15 illustrates a 3-D printer.

FIG. 15 illustrates a 3-D printer. Three-Dimensional (3D) printing is an additive manufacturing process of making three dimensional objects from a digital file. The creation of a 3D printed object is achieved using additive processes. In an additive process, an object is created by laying down successive layers of material until the object is created. Each of these layers can be seen as a thinly sliced cross-section of the object.

Figure 16:
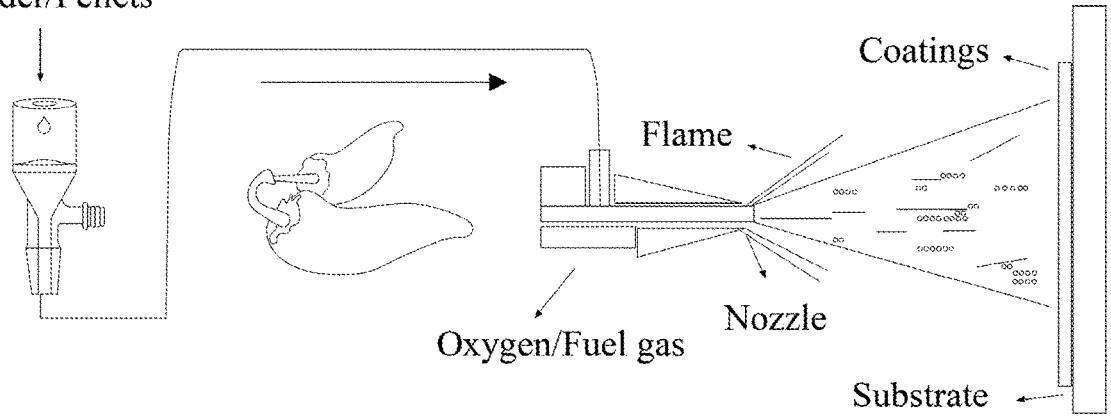
FIG. 16 illustrates an HDPE flame spraying apparatus and process.

FIG. 16 illustrates an HDPE flame spraying apparatus and process, where HDPE is sprayed onto a surface to form an HDPE coating. The HDPE flame sprayed on all internal surfaces of the air transfer apparatus.

As shown in FIG. 16, HDPE pellets are ground into the form of a powder and the HDPE material/powder is deposited on any surface or surfaces of the air transfer apparatus or enclosure and/or the heat exchanger or on all surfaces of the air transfer apparatus or enclosure by using a flame spray. Prior to spraying, all surfaces are cleaned by a substance such as deionized water, alcohol and/or acetone. Optionally, the surfaces may be mechanically coarsened by sand blasting with a material such as alumina or sand. For the flame spraying, any know fuel gas such as acetylene may be used with a flow rate in the range of $0.5 N/m^3/h$ to $2.5\ Nm^3/h$ and a pressure in the range of 0.01 MPa to 0.3 MPa. The pressure of oxygen is in the range of 0.03 MPa to 1.0 MPa and the flow rate of oxygen is in the range of $1.0\ Nm^3/h$ to $4\ Nm^3/h$. The feed rate of the HPDE powder is in the range of 10 g/min to 100 g/min. The spray distance from the nozzle exit to the surface(s) is 0.1 m to 0.3 m. It is noted that all the above values of the feed rates, flow rates and pressures can be lower and/or larger than disclosed above. Also, one or more additive components which include a flame-retardant material, an intumescent material, an antimicrobial agent, an ultraviolet light stabilizer, and a ceramic may be mixed with the HDPE powder or ground with the HDPE pellets forming a powder in order to provide further surface protection with the inherent properties of each additive component.

All of the above disclosed methods of manufacturing of molding, injection molding, gas assisted injection molding, liquid/water assisted injection molding, blow molding, extruding, electrofusion and 3-D printing can be used to make the monolithic air transfer apparatus or enclosure and/or an integral air transfer apparatus or enclosure.

An electronic device, such as a chip, is embedded into or onto any surface (e.g. a top, and/or a side and/or bottom and/or corner and/or edge) of the monolithic air transfer apparatus or enclosure and/or the integral air transfer apparatus or enclosure and which can be detected by a Global Positioning System (GPS) such that the monolithic air transfer apparatus or enclosure and/or the integral air transfer apparatus or enclosure can be found or located.

The invention claimed is:

1. A method of manufacturing an air transfer apparatus, where the method comprises the steps of:
    monolithically forming a top portion, a bottom portion, at least one side wall, and at least one cavity of the air transfer apparatus,
    wherein the monolithically forming of the air transfer apparatus is by a process of gas assisted injection molding or liquid assisted injection molding, and
    incorporating at least one indirect heat exchanger pad into the air transfer apparatus.

2. The method according to claim 1, wherein the incorporating is by integrally forming the at least one indirect heat exchanger pad into the air transfer apparatus during the monolithically forming of the air transfer apparatus.

3. The method according to claim 1, wherein the air transfer apparatus is manufactured from high-density polyethylene (HDPE).

4. The method according to claim 1, wherein the air transfer apparatus and the at least one indirect heat exchanger pad are manufactured from HDPE.

5. The method according to claim 1, further comprising a step of monolithically forming a plurality of segmented cavities within an integral cavity.

6. The method according to claim 5, the step of forming the plurality of segmented cavities comprising forming a plurality of individual dividers within the integral cavity.

7. The method according to claim 1, further comprising a step of connecting edge surfaces of a HDPE plate or panel to edge surfaces of the at least one side, or the at least one top or the bottom which is void of an air transfer apparatus panel or plate.

8. The method according to claim 7, further comprising a step of flame spraying HDPE on all internal surfaces of the air transfer apparatus.

9. The method according to claim 1, further comprising a step of forming a distribution apparatus into the air transfer apparatus during the monolithically forming of the air transfer apparatus.

10. The method according to claim 9, wherein the distribution apparatus is formed as a distribution plate.

11. The method according to claim 10, wherein the distribution plate is formed with a plurality of holes therein.

12. The method according to claim 11, wherein the plurality of holes are formed in a staggered arrangement or random arrangement so as to evenly allow pressurized fluid to flow through the plurality of holes onto an outer surface of the at least one indirect heat exchanger pad.

13. The method according to claim 1, wherein the bottom portion is formed with a slanted shape or a curved shape.

14. The method according to claim 1, further comprising a step of forming a channel device integrally with the bottom portion of the air transfer apparatus during the monolithically forming of the air transfer apparatus.

15. The method according to claim 14, further comprising a step of forming a plurality of channels spaced along a length of the channel device.

16. The method according to claim 1, further comprising a step of flame spraying HDPE on all internal surfaces of the air transfer apparatus.

17. A method of manufacturing an air transfer apparatus, where the method comprises the steps of:
    monolithically forming a top portion, a bottom portion, at least one side wall, and at least one cavity of the air transfer apparatus,
    wherein the monolithically forming of the air transfer apparatus is by a process of gas assisted injection molding or liquid assisted injection molding,
    incorporating at least one indirect heat exchanger pad into the air transfer apparatus, and
    electrofusion welding edge surfaces of a HDPE plate or panel to edge surfaces of the at least one side, or the at least one top or the bottom which is void of an air transfer apparatus panel or plate,
    wherein the electrofusion welding comprises attaching a wire to the edge surfaces of the HDPE plate or panel or to the edge surfaces of one of the at least one side, or the at least one top or the bottom which is void of the air transfer apparatus panel or plate, then heating the wire.

18. The method according to claim 17, wherein the step of the heating of the wire is to a temperature which melts the HDPE around the wire of the HDPE plate or panel and the air transfer apparatus.

19. A method of manufacturing an air transfer apparatus, where the method comprises the steps of:
    monolithically forming a top portion, a bottom portion, at least one side wall, and at least one cavity of the air transfer apparatus,
    wherein the monolithically forming of the air transfer apparatus is by a process of gas assisted injection molding or liquid assisted injection molding,
    monolithically forming a plurality of segmented cavities within an integral cavity, and
    installing a pump or motor or a pump and motor in one or more of the plurality of segmented cavities.

* * * * *